US012304103B2

(12) United States Patent
Carrasco

(10) Patent No.: US 12,304,103 B2
(45) Date of Patent: May 20, 2025

(54) CUTTING DEVICE

(71) Applicant: A O SCHALLINOX GMBH, Schocherswil (CH)

(72) Inventor: César Carrasco, Schocherswil (CH)

(73) Assignee: A O SHALLINOX GMBH, Schocherswil (CH)

( * ) Notice: Subject to any disclaimer, the term of this patent is extended or adjusted under 35 U.S.C. 154(b) by 310 days.

(21) Appl. No.: 17/911,533

(22) PCT Filed: Mar. 24, 2021

(86) PCT No.: PCT/EP2021/057629
§ 371 (c)(1),
(2) Date: Sep. 14, 2022

(87) PCT Pub. No.: WO2021/197975
PCT Pub. Date: Oct. 7, 2021

(65) Prior Publication Data

US 2023/0135959 A1 May 4, 2023

(30) Foreign Application Priority Data

Mar. 31, 2020 (EP) .................................... 20167163

(51) Int. Cl.
*B26D 7/26* (2006.01)
*B26D 1/45* (2006.01)
(Continued)

(52) U.S. Cl.
CPC ............. *B26D 7/2614* (2013.01); *B26D 1/45* (2013.01); *B26D 1/547* (2013.01); *B26D 7/086* (2013.01);
(Continued)

(58) Field of Classification Search
CPC .... B26D 7/2614; B26D 7/086; B26D 7/2628; B26D 1/45; B26D 1/547; B26D 2007/013;
(Continued)

(56) References Cited

U.S. PATENT DOCUMENTS

2014/0116222 A1* 5/2014 Carrasco ................ B26D 7/086 83/571

FOREIGN PATENT DOCUMENTS

EP 2 551 077 A1 1/2013

OTHER PUBLICATIONS

Jun. 28, 2021 International Search Report issued in International Patent Application No. PCT/EP2021/057629.

(Continued)

*Primary Examiner* — Nhat Chieu Q Do
(74) *Attorney, Agent, or Firm* — Oliff PLC

(57) ABSTRACT

A cutting device includes a tool drive, cutting tool having first and second connecting parts respectively connected to first and second followers, and a guiding device, that includes a first guiding unit with first and second guiding modules. The first guiding module includes guiding wheels, which are held each by related bearing devices rotatable in a guiding plane, peripherally adjacent to each other at a first transfer position. The guiding wheels include an outwardly open receiving opening suitable for receiving the first follower, rotatable by the tool drive in opposite directions with the same angular velocity. The guiding wheels are arranged so that their receiving openings lie opposite one another at the first transfer position after each revolution, so that the first follower is transferable alternately from one receiving opening into the other at the first transfer position and is guidable alternately along the periphery of the a guiding wheel.

15 Claims, 18 Drawing Sheets

(51) Int. Cl.
*B26D 1/547* (2006.01)
*B26D 7/08* (2006.01)
*B26D 5/08* (2006.01)

(52) U.S. Cl.
CPC ............ *B26D 7/2628* (2013.01); *B26D 5/086* (2013.01); *B26D 2210/02* (2013.01)

(58) Field of Classification Search
CPC ...... B26D 5/086; B26D 2210/02; B26D 7/26; B26D 7/08; B26D 5/08
USPC .............................................................. 83/820
See application file for complete search history.

(56) References Cited

OTHER PUBLICATIONS

Jun. 28, 2021 Written Opinion issued in International Patent Application No. PCT/EP2021/057629.

* cited by examiner

CUTTING DEVICE

The invention relates to a cutting device with a cutting tool.

BACKGROUND

EP2551077A1 discloses a cutting device, in which the connecting parts of a cutting tool are linearly displaceable, so that the cutting tool is displaceable back and forth along a straight line to perform cutting movements. The cutting tool is held on both sides by a guiding device with two guide modules, by means of which the connecting parts of the cutting tool are guided and mounted to be linearly displaceable along one path each. Furthermore, drive modules are provided by means of which the cutting tool is moved along the paths. By means of a control device, the drive modules are synchronised with each other so that the cutting tool remains horizontally aligned during the execution of the cutting movements.

The cutting tool or the metal blade is connected via a coupling element and an energy converter with an ultrasonic generator. During the cutting process, ultrasonic energy is applied to the metal blade so that the cutting process can be carried out with reduced resistance.

If the metal blade is not subjected to ultrasonic energy, as is the case with conventional cutting devices, the process material to be cut is compressed more during the cutting process than when ultrasonic energy is applied. Under the influence of the cutting tool, a deformation of the elastic process material occurs, which is reduced when ultrasonic energy is applied. The deformation of the process material can have an unfavourable effect on the cutting pattern. If, on the other hand, the process material is hard and possibly also brittle, it may break under the effect of the cutting tool.

The described problem of the deformation of the process material also requires a limitation of the cutting cycles, since the forces acting increase accordingly with increased speed and displacement.

Due to the forces acting on the process material and the forces acting back from the process material on the cutting tool, there is also a higher stress on the cutting tool, which leads to higher maintenance requirements and an earlier replacement of the cutting tool.

SUMMARY

The present invention is therefore based on the object of creating an improved cutting device.

In particular, a cutting device shall be created that is simple in design and at the same time provides improved cutting results.

Any process material shall be cut advantageously by means of the cutting device. Deformation, in particular compression, of the process material shall be avoided. Accordingly, cutting processes shall be carried out precisely and improved cutting patterns shall be achieved to a great extent independent of the nature of the process material.

The cutting operations should be able to be carried out with higher clock cycles.

The cutting device shall be compact and take up little space, so that it can be integrated advantageously into any production process.

The cutting device shall be manufactured with reduced effort. In particular, guiding devices and drive devices for the cutting tool shall be simpler in design and less expensive.

This task is solved with a cutting device which comprises the features indicated in claim 1. Advantageous embodiments of the invention are specified in further claims.

The cutting device comprises a tool drive, a cutting tool having a first connecting part, which is connected to a first follower, and having a second connecting part, which is connected to a second follower, as well as a guiding device, which comprises a first guiding unit with a first guiding module and a second guiding module, with which the first follower is held displaceable along a first guideway and the second follower is held displaceable along a second guideway.

According to the invention, the first and/or the second guiding module comprises two guiding wheels, a) which are held each by related bearing devices rotatable in a guiding plane;
b) which are peripherally adjacent to each other at a first transfer position;
c) which each comprise an outwardly open receiving opening, which is suitable for receiving the first follower;
d) which are rotatable by the tool drive in opposite directions with the same angular velocity; and
e) which are arranged in such a way that their receiving openings lie opposite one another at the first transfer position after each revolution, so that the first follower is transferable alternately from one receiving opening into the other receiving opening at the first transfer position and is further guidable alternately along the periphery of the first guiding wheel or of the second guiding wheel.

During operation of the cutting device, for example, the first follower in the first guiding module is thus guided in a guideway alternately first around the first guiding wheel and then around the second guiding wheel, which rotate synchronously with each other in opposite directions. The resulting guideway corresponds to a figure of eight. The first follower and thus the associated connecting part of the cutting tool is thus moved back and forth in a first direction by twice the diameter of a guiding wheel and in a second direction perpendicular to the first direction by the single diameter of a guiding wheel.

In this operation, the second follower in the second guiding module can be moved along an identical, linear or curved guideway. The second follower can follow the movements of the first follower passively or slavishly. For example, a linear or curved guiding channel is provided in the second guiding module along which the second follower can follow the movements of the first follower. By appropriate dimensioning and alignment of the second guiding channel, the deflection of the cutting tool can be determined accordingly.

Preferably, however, the second follower is also actively guided in the same way as the first follower. For this purpose, the second guiding module also comprises a first guiding wheel and a second guiding wheel, a) which are rotatably held by related bearing devices;
b) which are peripherally opposite each other at a second transfer position;
c) which each comprise an outwardly open receiving opening on the periphery which is suitable for receiving the second follower;
d) which can be rotated by the tool drive with the same angular velocity in opposite directions;
e) which are arranged in such a way that their receiving openings are opposite each at the second transfer position after each revolution, so that the second follower can be transferred alternately from one to the other receiving opening at the second transfer position and can be guided alternately along the periphery of the first guiding wheel or of the second guiding wheel of the second guiding module.

The first and the second guiding module are thus preferably identical, preferably arranged within a guiding plane, possibly rotated 180° against each other and spaced apart according to the length of the cutting tool.

The rotation axes of the wheels of the first guiding module and the wheels of the second guiding module preferably define the corners of a rectangle or a parallelogram in the intersections of the guiding plane.

The first follower and the second follower run synchronously in spaced-apart identical and identically aligned guideways, possibly guided in congruent guide channels.

The guiding wheels can be rotated at high speed so that a process material can be cut with high cycle rates.

During the cutting process, a cutting movement takes place in two directions. The cutting tool always remains aligned parallel and is moved cyclically downwards and upwards along its longitudinal axis with a first cutting movement. At the same time, the cutting tool is moved back and forth perpendicularly with a second cutting movement. With the first cutting movement, the cutting tool can be guided tangentially along the process material, while at the same time, with the second cutting movement, the cutting tool is guided against the process material or into the process material in order to cut it open. With simple rotational movements of the guiding wheels, an ideal cutting movement can be carried out, which allows the process material to be cut precisely and quickly.

The process material is cut open by the first cutting movement, while the process material is not compressed by the second cutting movement. Due to the avoidance of the compression of the process material, precise cuts and precise cutting patterns result. Process material, in particular foodstuffs such as meat, bread, cheese or other industrial goods, can thus be cut optimally, i.e. extremely precisely and with high cycle rates.

If the cutting tool is designed as a wire or a blade that comprises cutting edges on both sides, the process material can be cut from both directions by means of the wire or the blade, which doubles the cycle frequency of the cuts.

If a wire is used as cutting tool, it is preferably rotatably mounted and driven by at least one tool motor. Preferably both wire ends or connecting parts of the cutting tool are connected to tool motors, so that a torsion of the wire is avoided and it can be rotated at highest speeds. The wire can rotate at speeds preferably selectable or adjustable by the control unit between zero to over 1000 revolutions per second, resulting in high cutting performance. The rotating wire can be guided into the process material with practically no resistance.

The guiding device described so far comprises only one first guiding unit, which is practically aligned in a first guiding plane.

To increase the performance and stability, the guiding device is preferably equipped with a first guiding unit and a second guiding unit. The second guiding unit is preferably a mirror image of the first guiding unit and lies in a parallel guiding plane, preferably frontally opposite. The axes of rotation of the guiding wheels of the first and the second guiding unit are preferably aligned coaxially to each other. The distance between the two guiding units and thus the distance between the two guiding planes is preferably chosen according to the dimensions of the cutting tool and associated equipment, such as tool motors or ultrasonic transducers, which are held and guided between the two guiding planes or guiding units. The guiding units are preferably identical and can be manufactured with minimal effort.

In this embodiment, the cutting tool is held on both sides at both connection parts, which is why no bending stresses and torsions result. The cutting tool can be guided powerfully without overloading.

In each of the embodiments described, the guiding device can be made extraordinarily compact. The dimensions of the guiding units are determined by the dimensions of the cutting tool and by the deflection of the cutting tool in the first and second directions of movement. This means that only as much space is required as is needed by the cutting tool itself. The guiding units themselves can be manufactured with a small thickness of for example about 1 cm to 2 cm. A more compact design is therefore hardly possible.

The inventive cutting device can therefore be advantageously integrated into any processes and devices. Due to the compact design, the cutting device can also be integrated into vending machines that cut a process material to be sold. For example, the cutting device is combined with a conveyor device that cuts bread or cakes. The conveyor device can also feed different process materials sequentially into the cutting process, for example first bread and then meat and then bread again. In this way, fresh sandwiches can be cut automatically.

Particularly advantageous is the mirror-image or symmetrical design of the guiding devices, which use essentially the same device parts for all guiding modules. For example, identical guiding wheels can be used, which only need to be coupled together in pairs in the appropriate orientation.

The inventive cutting device can be constructed modularly and assembled in a few simple steps.

The guiding wheels can be driven in various ways. Preferably, the tool drive comprises a single drive motor, by means of which all guiding wheels of the guiding device are driven via a correspondingly designed force transmission device. The force transmission device may comprise interconnected toothed wheels and/or toothed belts. Furthermore, a drive module can be assigned to each guiding unit or each guiding module or each guiding wheel. In this case, the synchronisation of all guiding wheels must be ensured. For example, sensors are used to determine the positions of the guiding wheels and correct them if necessary. The drive can be carried out by stepper motors, which control the related guiding wheels accordingly.

It is particularly easy to drive the guiding wheels if they are designed as gear wheels and comprise peripheral toothing. It is sufficient to drive only one of two toothed gear wheels. The corresponding toothing of the guiding wheels automatically synchronises them. In this case, the pairs of guiding wheels can also be driven with little effort by a single drive motor through transmission shafts and gear wheels.

The tool drive can therefore be easily set up in a centralised or decentralised manner.

After each rotation of the guiding wheels, the follower and the receiving openings of the guiding wheels reach the related transfer positions. At this transfer position, the receiving openings may be opposite each other with a slight slope. Due to the moving mass, the followers at the transfer position try to continue their path in a straight line, which runs from the first guiding wheel towards the neighbouring guiding wheel. At the same time, centrifugal forces act which cause the followers to enter from the receiving opening of one guiding wheel into the receiving opening of the other guiding wheel. In this way, an automatic transfer of the follower and of the cutting tool connected to it takes place.

The transfer of the follower from the receiving opening of the one guiding wheel to the receiving opening of the other guiding wheel is supported in preferred embodiments by additional guiding elements that can be used individually or in combination.

In a first preferred embodiment, a preferably at least approximately V-shaped first guiding collar is arranged at the receiving opening of the first guiding wheel and a preferably at least approximately V-shaped second guiding collar is arranged at the receiving opening of the second guiding wheel.

The first guiding collar is preferably designed to project beyond the first guiding wheel and to engage the second guiding collar at the transfer position. In the transfer position, the two guiding collars define a possibly self-contained transfer channel along which the associated follower is safely guided from the receiving opening of the first guiding wheel to the receiving opening of the second guiding wheel.

As auxiliary elements, possibly rotatably mounted magnets can also be provided which attract or repel the followers or magnets directly or indirectly connected thereto in order to hold them in the receiving openings or eject them therefrom.

In a preferred embodiment, the first and/or the second follower, the first and the second guiding unit are connected to each other by a first guiding shaft. The guiding shafts can fulfil different functions. On the one hand, the guiding shafts can serve as bearings for the follower, which for example are designed as hollow cylinder elements and can rotate around the guiding shafts. Preferably, the guiding shafts project outwards from the follower on both sides and are connected outside the follower with their end pieces with a guiding slide.

In preferred embodiments, the followers are rotatably mounted so that they can be moved as smoothly as possible along the guideway in a guiding channel.

In preferred embodiments, the followers and/or the guiding slides are guided in guiding plates. Preferably, each of the guiding modules comprises a guiding plate serving to support the related guiding wheels. Each guiding plate preferably comprises a guiding channel running parallel to the guideway along which the associated follower is guided. The guiding channel comprises at least one channel segment which serves for the direct or indirect guidance of the related follower.

Preferably, a first channel segment is provided, which serves to accommodate an end piece of the related follower. The followers are thus preferably guided in this first channel segment parallel to the guideway.

Alternatively or in addition to the first channel segment, a second channel segment is preferably provided, which is designed to receive an elongated and rotatably mounted guiding slide, which is directly or indirectly connected to the related follower. The guiding slide can be directly or indirectly, fixed or rotatably connected to the follower. Preferably, however, the guiding slide is attached to the guiding shaft, which protrudes over the follower accordingly. The guiding slide is guided in the guiding channel or in the second channel segment substantially straight along the guideway, so that it always passes diagonally through the crossing point, which is located at a related transfer position. In this way, the guideway is always passed through smoothly and correctly.

Preferably, a third channel segment is provided in which the guiding wheels are countersunk. By countersinking the guiding wheels, it is ensured that followers held in the receiving openings cannot exit the receiving openings outside the transfer position.

The connecting parts of the cutting tool can be connected to the followers in any way. Preferably, articulated connections are provided. In a preferred embodiment, the first and second followers are connected directly or indirectly, for example by a bearing block, to the related first or second connecting part of the cutting tool.

Any auxiliary devices can be attached to the bearing block, in particular auxiliary devices that serve measuring purposes and/or act on the cutting tool. Sensors that are moved with the cutting tool can be used to monitor the cutting process, if necessary.

Preferably, the first and second followers are each connected to a bearing block that holds an ultrasonic transducer, which in turn is connected to the related connecting part to deliver ultrasonic energy to the cutting tool.

Inventive cutting devices can be advantageously integrated into any process chains, any devices, vending machines and the like. The process material to be cut is preferably fed by means of a conveyor device in process steps that are synchronised with the cutting cycles. For each step to be executed, the process material is pushed into a desired position beforehand. If the cutting tool comprises a cutting edge on both sides or if the cutting tool is a wire, the process material can be cut from both sides. After each deflection, the process material is advanced according to the desired cutting thickness and made available for the next cutting cycle. With each pass through the guideway, the cutting tool can therefore execute a cut twice.

BRIEF DESCRIPTION OF THE DRAWINGS

The invention is explained in more detail below with reference to the drawings. Thereby shows.

DETAILED DESCRIPTION

Figure 1:
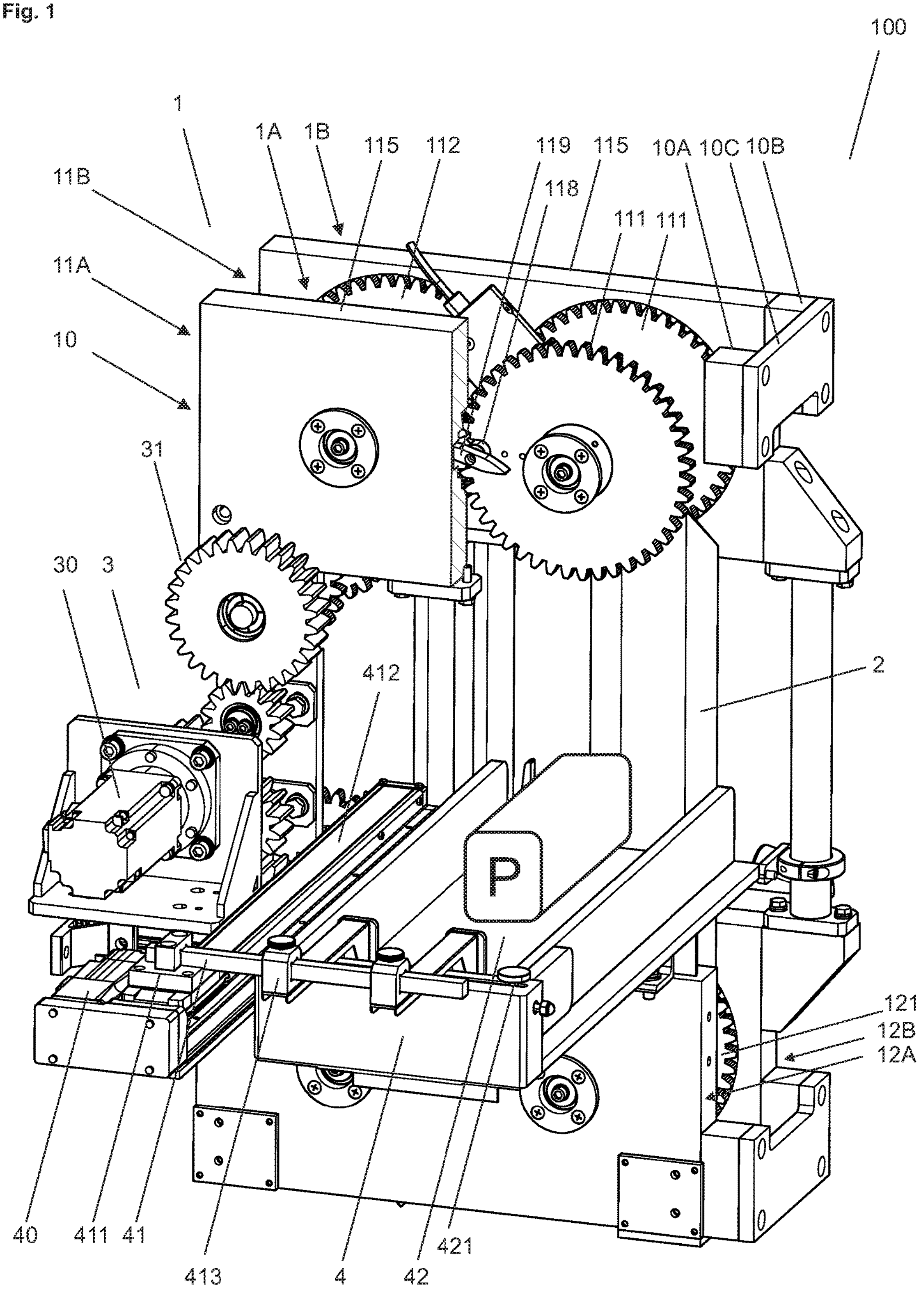
FIG. 1 an inventive cutting device 100 in a preferred embodiment with a conveyor device 4 for conveying a process material P to be cut, with a tool drive 3 and a cutting tool 2, which is held by a guiding device 1, which comprises two guiding units 1A, 1B, which are spaced apart from one another and operate synchronously, each comprising an upper guiding module 11A, 11B and a lower guiding module 12A, 12B, each comprising two mutually coupled guiding wheels 111, 112; 121, 122, by means of which a respective follower 118, 128 connected to the cutting tool 2 can be circulated along a loop which runs along the periphery of the guiding wheels 111, 112; 121, 122 coupled to one another.

FIG. 1 shows an inventive cutting device 100 in a preferred embodiment with a guiding device 1, which comprises two guiding units 1A, 1B, which serve to guide a cutting tool 2, which is held between the guiding units 1A, 1B and can be guided in vertical alignment along a guide loop. The two guiding units 1A, 1B, which are preferably mirror-inverted and aligned frontally with respect to each other, each comprise an upper guiding module 11A; 11B and a lower guiding module 12A; 12B. The guiding modules 11A, 11B; 12A, 12B are preferably identical and may be rotated by 180° in relation to each other.

Figure 2A:
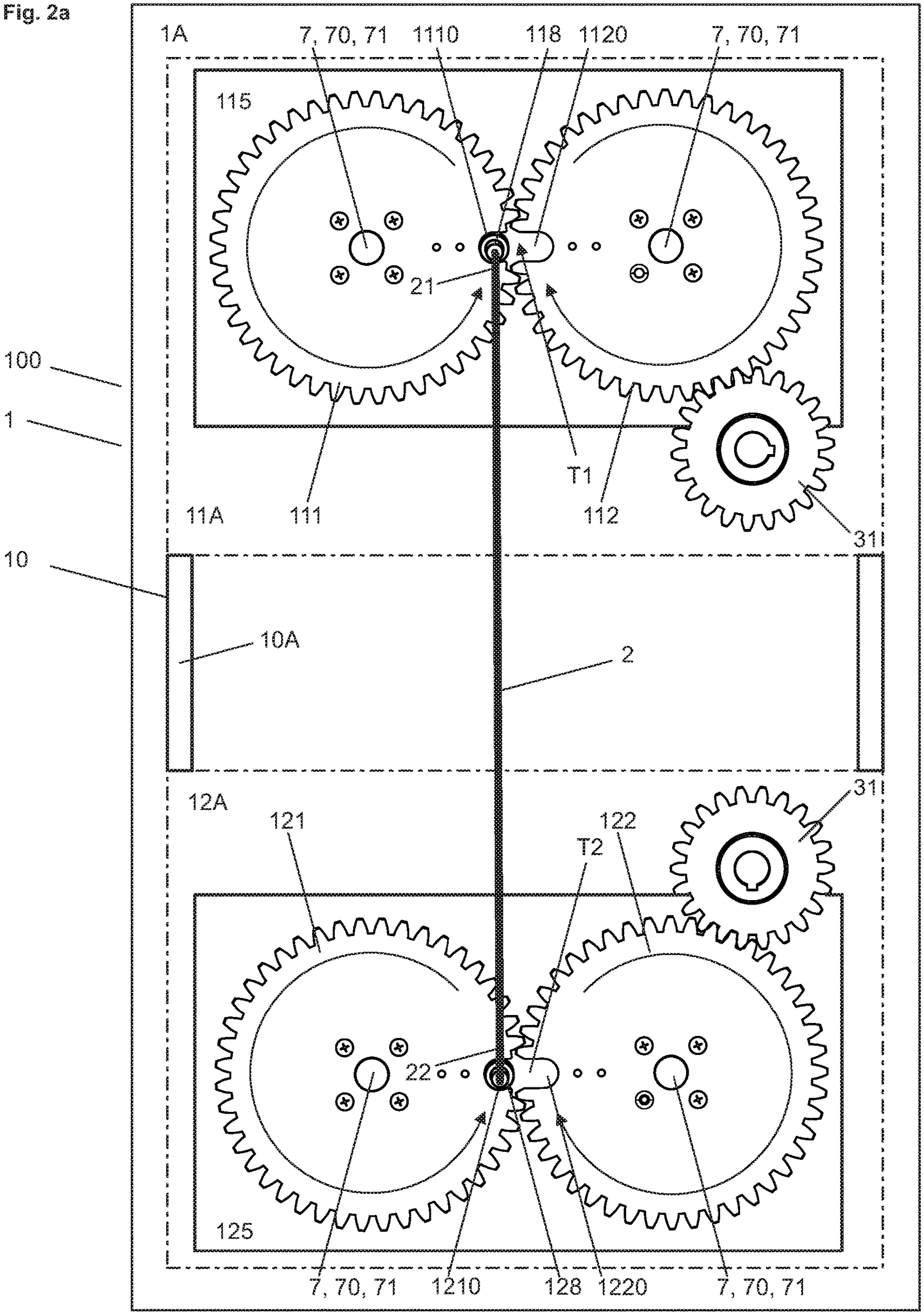
FIG. 2*a* the cutting device 100 of FIG. 1 with a wire-shaped cutting tool 2 and the guiding device 1 without the second guiding unit 1B, which is only optionally provided.

Each of the guiding modules 11A; 11B; 12A; 12B comprises a first guiding wheel 111; 121 and a second guiding wheel 112; 122, which are rotatably held in pairs by guiding plates 115; 125 (see FIG. 2*a*). The guiding wheels 111, 112; 121, 122 are formed as toothed wheels and engage in each other with their toothing. The guiding plate 115 of the upper guiding module 11A of the first guiding unit LA has been cut vertically in the middle.

From each pair of cooperating guiding wheels 111, 121; 112, 122 a follower 118; 128 (see FIG. 2*a*) is held and circulated along the guiding loop. A guiding slide 119; 129 (see for example FIG. 3*c*) is provided coaxially aligned with each follower 118; 128. The end pieces of the followers 118, 128 which are facing the guiding plates 115, 125, and the guiding slides 119, 129 are guided in guiding channels, which are arranged in each of the related guiding plates 115; 125 and run parallel to the guiding loop.

Below it is described and shown that each follower 118; 128 is alternately circulated by the related pair of guiding wheels 111, 121; 112, 122 along their periphery, which is why the guideway comprises the shape of figure eight. The cutting tool 2 is thus cyclically guided along a figure-of-eight path comprising a crossing point or transition point T1; T2 (see FIG. 2*a*).

The guiding device 1 comprises a mounting structure 10 connecting the two guiding units 1A, 1B and their guiding modules 11A, 11B, 12A, 12B. The two guiding units 1A, 1B comprise associated structural units 10A, 10B which are interconnected by connecting elements 10C.

Figure 9:
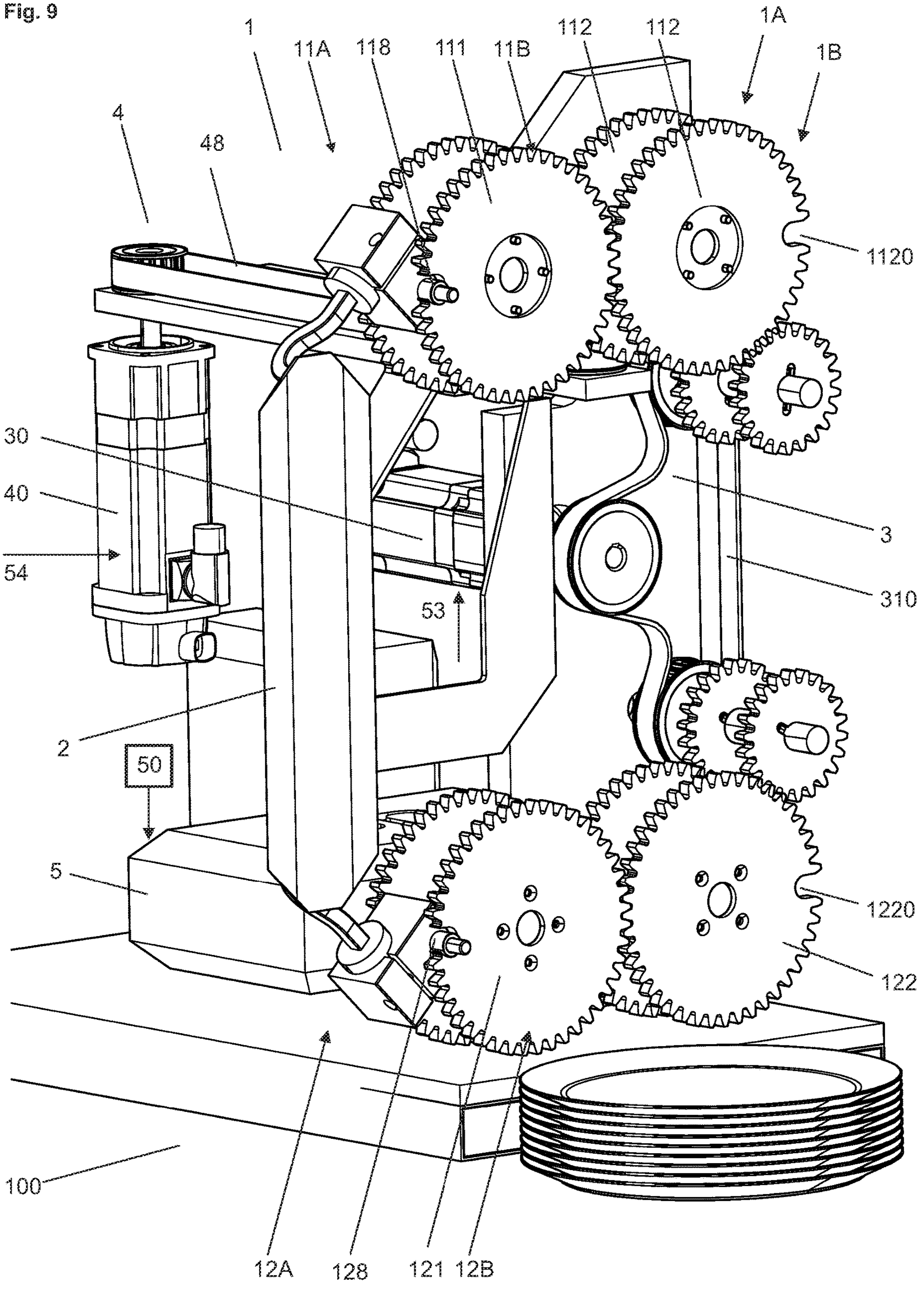
FIG. 9 the cutting device 1 of FIG. 1 in a further preferred embodiment and a tool drive 3 comprising a force transmission device 310 with drive belts.

The guiding wheels 111, 121; 112, 122 and the cutting tool 2 are driven by means of a tool drive 3, which comprises a drive motor 30, which drives the guiding wheels 112; 122 (see FIG. 2*a*) via a force transmission device 31, which drives the associated further guiding wheel 111; 121 via their toothing. The force transmission device 31 comprises gear wheels which are rotatably held by gear wheel shafts and which are positively coupled on the one hand to the drive motor 30 and on the other hand to the guiding wheels 112, 122. The power transmission from the drive motor 30 to the guiding wheels 112, 122 can also be effected by drive belts, preferably a toothed belt and possibly toothed wheels, as shown in FIG. 9. It is also possible to drive the guiding wheels 111, 121; 112, 122 by individually assigned drive motors that operate synchronously.

The guiding device 1 with the cutting tool 2 can be integrated in any devices and processes in order to cut a process material P. FIG. 1 shows an example of a conveyor device 4 with a pushing device 41, by means of which a process material P can preferably be pushed step by step against the cutting tool 2. The pushing device 41 comprises a conveyor motor 40, by means of which a feed slide 411 can preferably be moved stepwise along a feed track 412. With the feed slide 411, pushing tools 413 are displaceable against the process material P. The process material P is guided by side plates 421 and is displaced against the cutting tool 2, preferably step by step, via a feed plate 42 in accordance with the cutting cycles.

The cutting device 100 preferably comprises a control unit 5, by means of which the movement of the cutting tool 2 and the feeding tools 413 can be controlled. FIG. 9 shows that the position of the cutting tool 2 is detected by at least one sensor 50 and reported to the control unit 5. Subsequently, the control unit 5 sends corresponding control signals 53, 54 to the drive motor 30 and the conveyor motor 40 to control the feed of the process material P according to the movements of the cutting tool 2. After performing a cutting cycle and before starting the next cutting cycle, the process material P can be advanced by a distance corresponding to the set cutting thickness. The control unit 5 can be, for example, a conventional personal computer.

In preferred embodiments, the control unit 5 also comprises an alternating voltage generator, by means of which alternating voltages in the ultrasonic range are generated and applied to sound transducers 25, which are connected to connecting parts 21, 22 of the cutting tool 2. The alternating voltages are fed, for example, to piezo elements which convert the electrical oscillations into mechanical vibrations.

FIG. 1 shows the cutting device 100 in a preferred embodiment with two upper guide modules 11A, 11B and two lower guide modules 12A, 12B. The connecting parts 21, 22 (see FIG. 2*a*) provided at both ends of the cutting tool 2 are held and guided on both sides in this embodiment. The guiding device 1 can also be designed in such a way that the connecting parts 21, 22 are only guided on one side in a guiding module 11A; 12A. Furthermore, it can be provided that only one of the connecting parts 21; 22 of the cutting tool 2 is guided on one side through one or on both sides through two guiding modules 11A, 11B; 12A, 12B lying opposite each other (see FIG. 5*c*) and the other connecting part 22; 21 follows in any path. The cutting device 100 can therefore be constructed and extended according to the needs of the user.

FIG. 2*a* shows the cutting device 100 of FIG. 1 with a symbolically shown, optionally wire-shaped cutting tool 2 and the guiding device 1 with the first guiding unit 1A from the viewpoint of the second guiding unit 1B, which is, however, only optionally provided.

The end pieces or connecting parts 21, 22 of the cutting tool 2 are each connected with a follower 118, 128, which can be circulated in a figure-of-eight path alternately along the periphery of the two mutually corresponding guiding wheels 111, 112; 121, 122, which are held by means of bearing devices 7. The bearing devices 7 comprise bearing shafts 71 which are held in central bearing openings 70 of the guiding wheels 111, 112; 121, 122.

The guiding wheels 111, 112; 121, 122 a) are peripherally adjacent to each other at transfer positions T1, T2;

b) are designed as toothed wheels and engage in one another with toothing;

c) each peripherally comprise a receiving opening 1110, 1120; 1210, 1220 which is open at least approximately radially outwards and serves to receive a follower 118; 119;

d) are rotatable by the tool drive 3 with the same angular velocity in opposite directions;

e) are arranged in such a way that their receiving openings 1110, 1120; 1210, 1220, as shown in FIG. 2*a*, lie opposite each other after each revolution at the related transfer position T1; T2, so that the followers 118; 119 can be transferred alternately from one receiving opening 1110, 1120; 1210, 1220 to the other at the transfer position T1; T2 and can be guided further alternately along the periphery of the first guiding wheel 111; 121 or of the second guiding wheel 112; 122.

In FIG. 2*a*, the followers 118, 128, which have just passed around the first guiding wheels 111, 121, are held in the receiving openings 1110, 1120 of the first guiding wheels 111, 121 and are subsequently transferred by centrifugal forces or guided by force into the receiving openings 1120, 1220 of the second guiding wheels 112, 122 and subsequently pass around the second guiding wheels 112, 122. Even before reaching the transfer positions T1, T2, the followers 118, 128 can move outwards so that they are thrown into the adjacent receiving openings 1120, 1220.

Figure 2B:
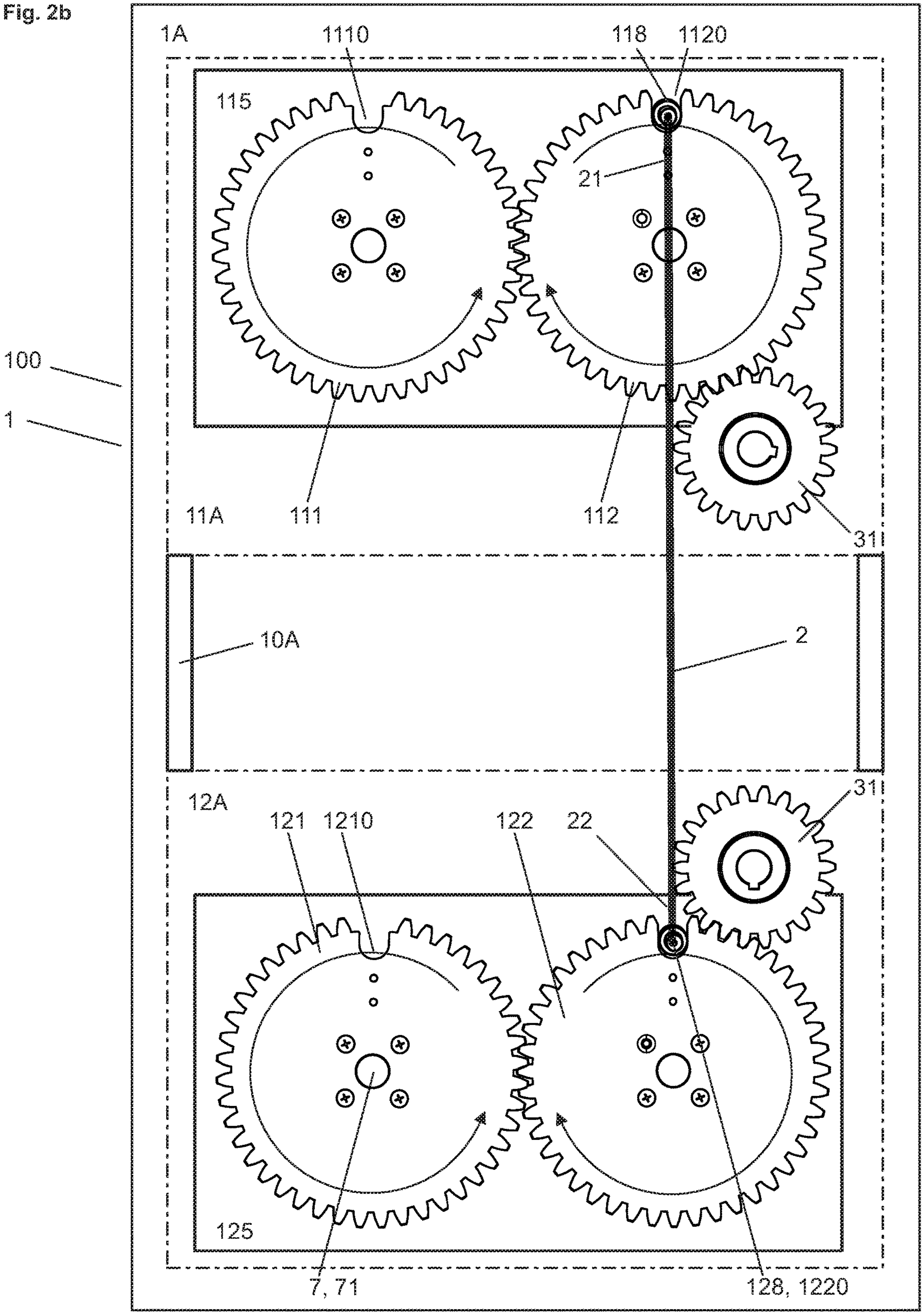
FIG. 2*b* the cutting device 100 of FIG. 2*a* after a rotation of the coupled guiding wheels 111, 112; 121, 122 by 90° in opposite directions, after which the cutting tool 2 has been moved an eighth of the way within the self-contained loop.

FIG. 2*b* shows the cutting device 100 of FIG. 2*a* after the transfer of the follower 118, 128 to the second guiding wheels 112, 122 and a further rotation of the coupled guiding wheels 111, 112; 121, 122 by 90° in opposite directions, after which the cutting tool 2 was moved one eighth of the way within the closed loop. The cutting tool 2 was not only guided to the right in the direction of the second guiding wheels 112, 122, but also upwards.

It is therefore visible that the connecting parts 21, 22 of the cutting tool are deflected downwards and upwards twice during a cycle according to the diameter of the guiding wheels 111, 112; 121, 122 and moved back and forth according to twice the diameter of the guiding wheels 111, 112; 121, 122. The cutting tool 2 thus performs a tangential movement relative to the process material while it is guided through the process material. The process material is thus cut with high precision without being compressed.

Figure 3A:
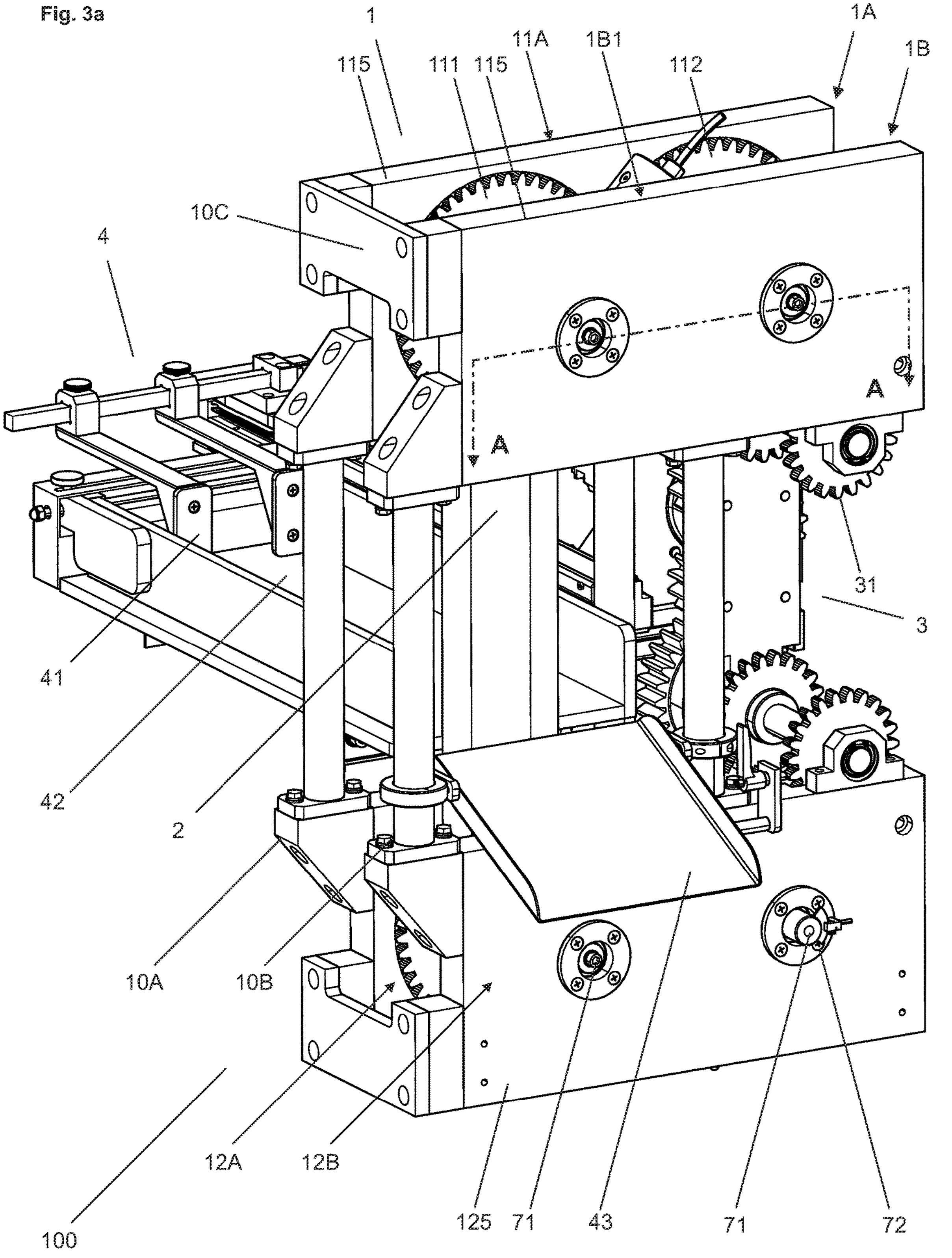
FIG. 3*a* the cutting device 100 of FIG. 1 from the front side with the guiding device 1 with the two guiding units 1A, 1B, between which the cutting tool 2 is held so that it can circulate within the loop and which are each provided with an upper guiding plate 115 and a lower guiding plate 125 for mounting the guiding wheels 111, 112; 121, 122.

FIG. 3*a* shows the cutting device 100 of FIG. 1 from the front side with the guiding device 1 with the two guiding units 1A, 1B, between which the cutting tool 2 is held circulatable within the loop. The guiding wheels 111, 112; 121, 122 are mounted in pairs in upper and lower guiding plates 115, 125.

The process material (not shown) is conveyed via the feed plate 42 to the cutting tool 2, which is cyclically guided back and forth in front of the feed plate 42, preferably corresponding to the entire width of the feed plate 42.

Figure 3B:
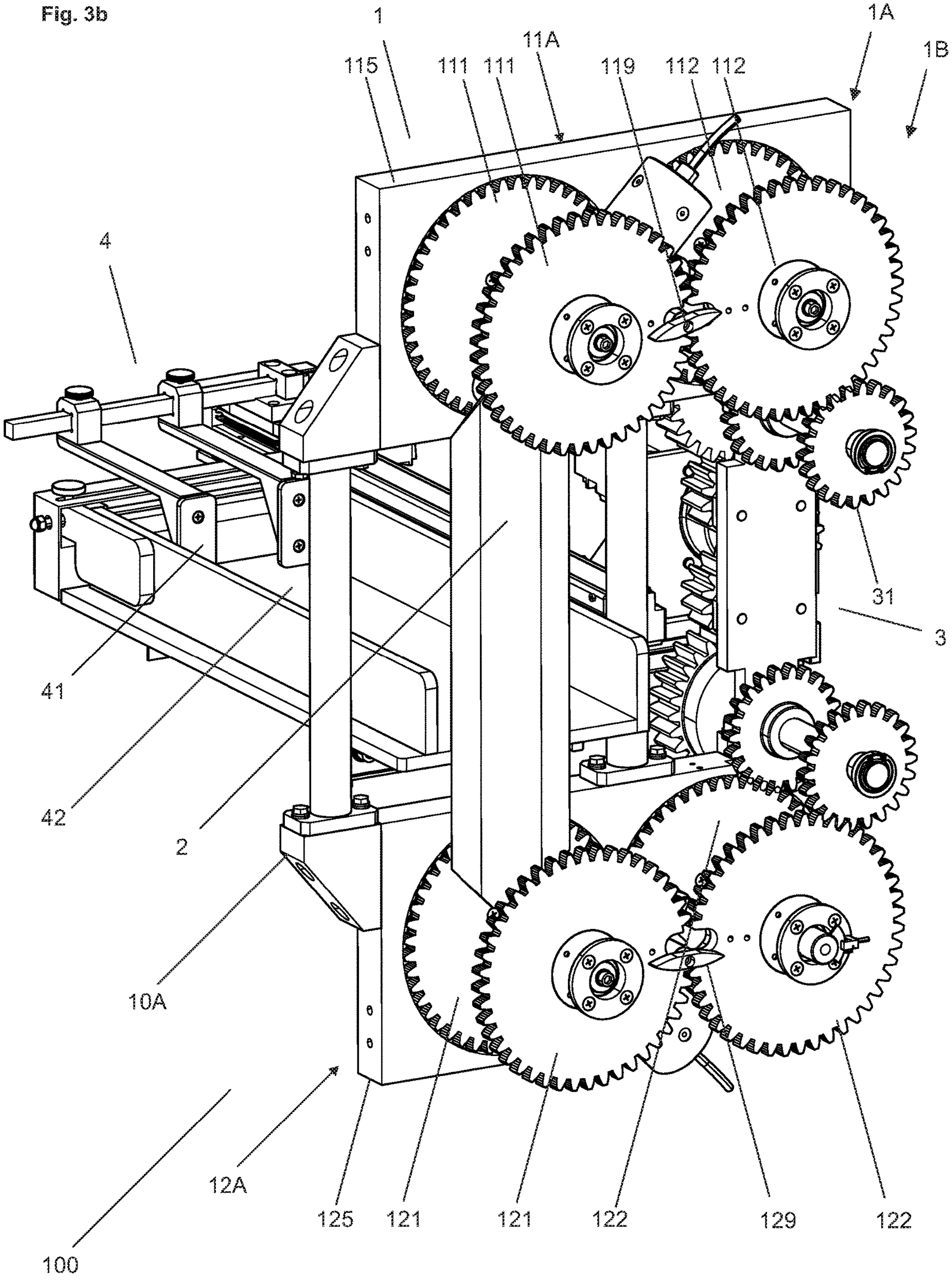
FIG. 3*b* the cutting device 100 of FIG. 3*a* after removal of the upper and lower guiding plates 115, 125 from the second guiding unit 1B.

FIG. 3*b* shows the cutting device 100 of FIG. 3*a* after removal of the upper and lower guiding plates 115, 125 from the second guiding unit 1B. The guiding slides 119, 129 are exposed at the front and are guided in guide channels provided in the removed guiding plates 115, 125.

Figure 3C:
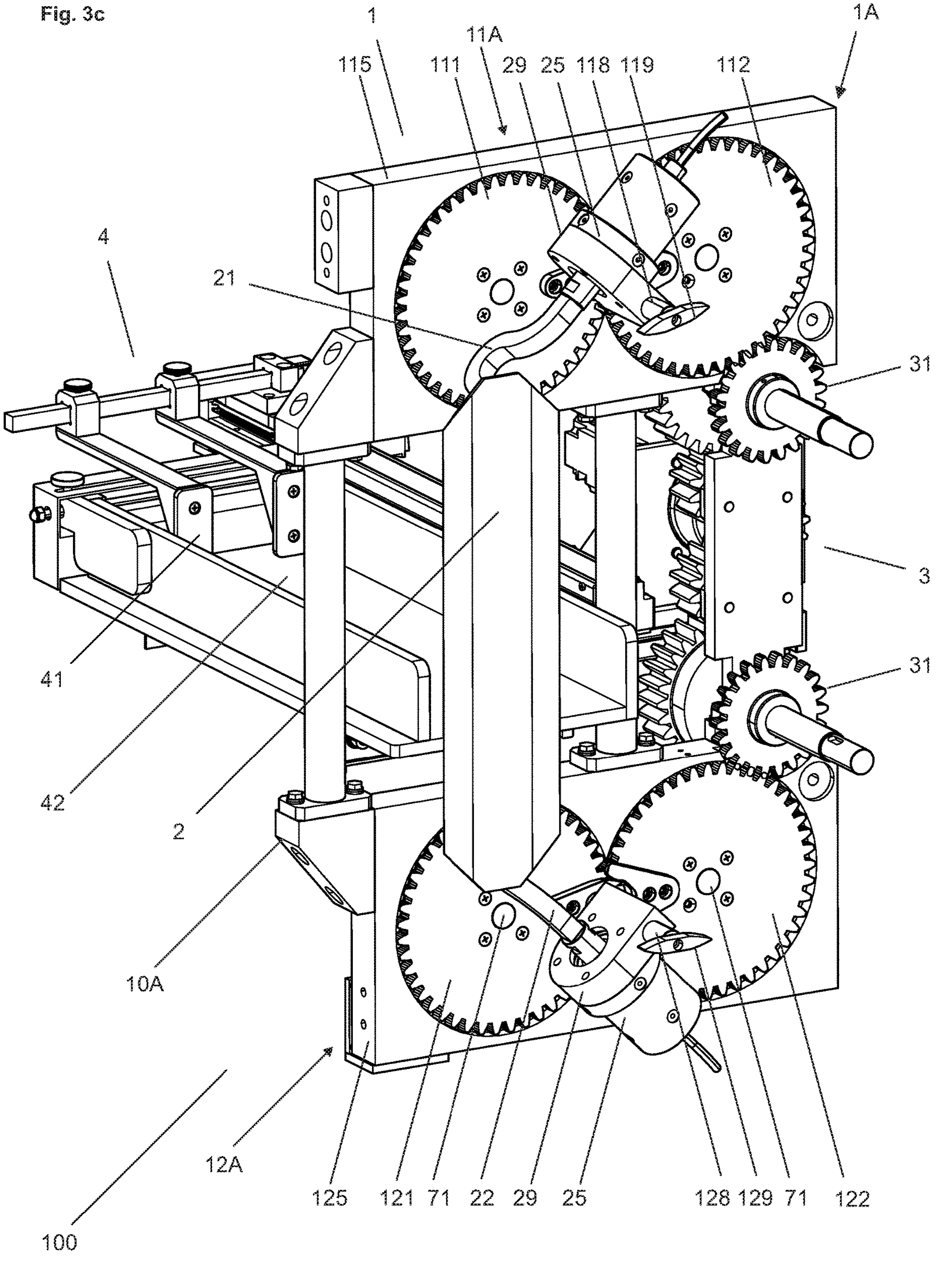
FIG. 3*c* the cutting device 100 of FIG. 3*b* without the optionally provided second guiding unit 1B, looking at the cutting tool 2 whose connecting parts 21, 22 are held by optionally provided ultrasonic transducers 25.

FIG. 3*c* shows the cutting device 100 of FIG. 3*b* without the optionally provided second guiding unit 1B, looking at the cutting tool 2 whose connecting parts 21, 22 are held by optionally provided ultrasonic transducers 25. It should be noted that the guiding device 1 can also be realised in this configuration, i.e. only with the first guiding unit 1A. The double-sided guiding is preferred when process material is cut with high force. The force required to cut the process material, on the other hand, can be reduced by applying ultrasonic energy to the cutting tool 2. It is shown that the followers 118, 128 each hold a mounting body 29 on which an ultrasonic transducer 25 is mounted. Each of the ultrasonic transducers 25 is in turn connected with a connecting part 21, 22 of the cutting tool 2. The connecting parts 21, 22 are connected, for example, with a metal cylinder, which is braced inside the ultrasonic transducer 25 with piezo elements. By applying electrical alternating voltages in the subsonic range to the piezo elements, ultrasonic waves are generated which are transmitted to the cutting tool 2 via the connecting parts 21, 22.

Figure 3D:
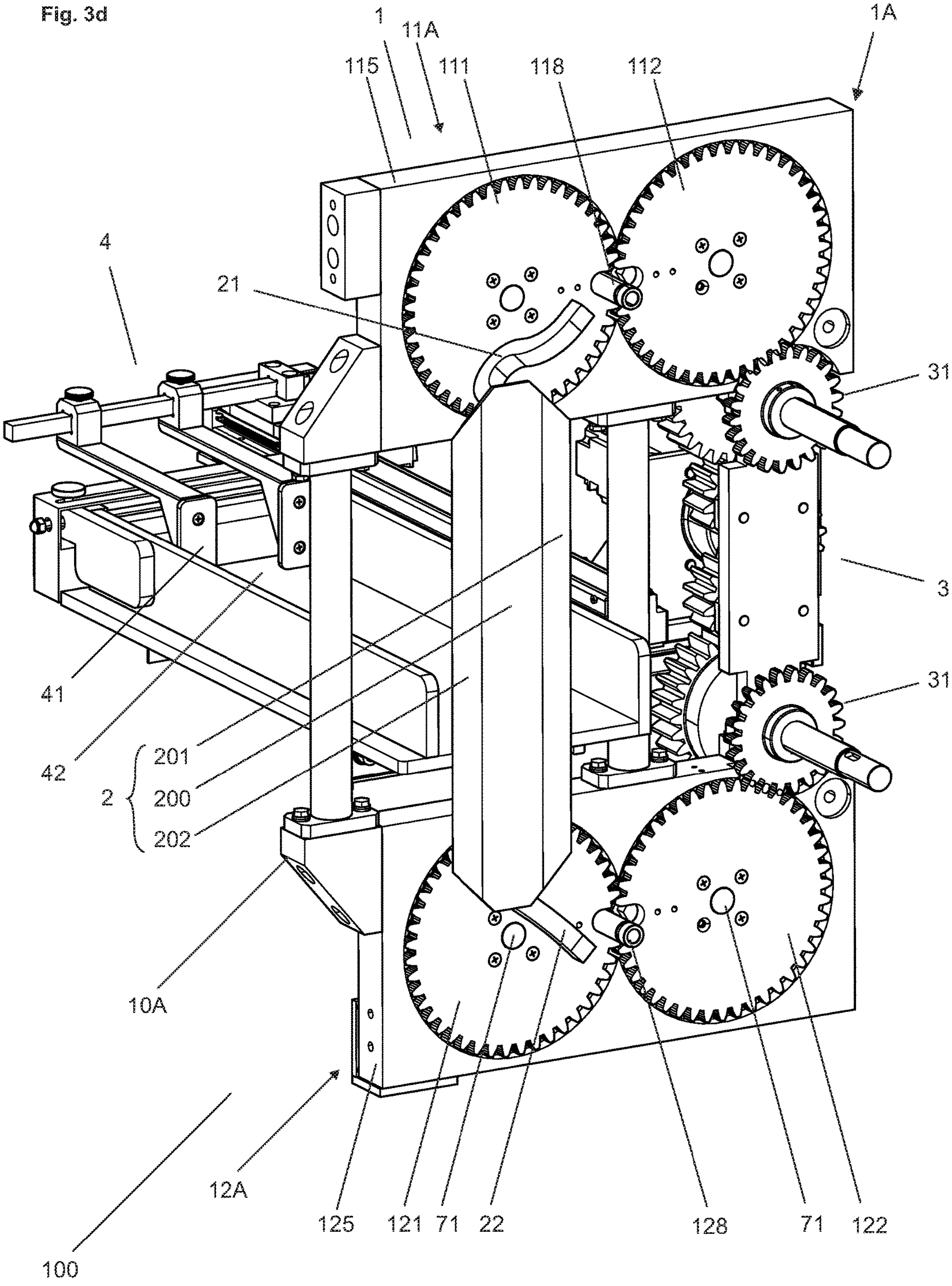
FIG. 3*d* the cutting device 100 of FIG. 3*c* without the ultrasonic transducer 25 looking at the followers 118, 128 in a position in which they are transferred from the first guiding wheels 111, 121 to the second guiding wheels 112, 122.

FIG. 3*d* shows the cutting device 100 of FIG. 3*c* without the ultrasonic transducer 25 looking at the followers 118, 128 in the position of FIG. 2*a*, in which they are transferred from the first guiding wheels 111, 121 to the second guiding wheels 112, 122. Any cutting tools 2 can be connected to the followers 118, 128. Preferably, the exemplarily shown cutting tool 2 is used, which comprises a blade 200, which is provided with cutting edges 201, 202 on opposite sides. With such a cutting tool 2, possibly also with a wire-shaped cutting tool 2 (see FIG. 5*d*), a cut can be made in any direction of movement from left to right and from right to left.

Figure 3E:
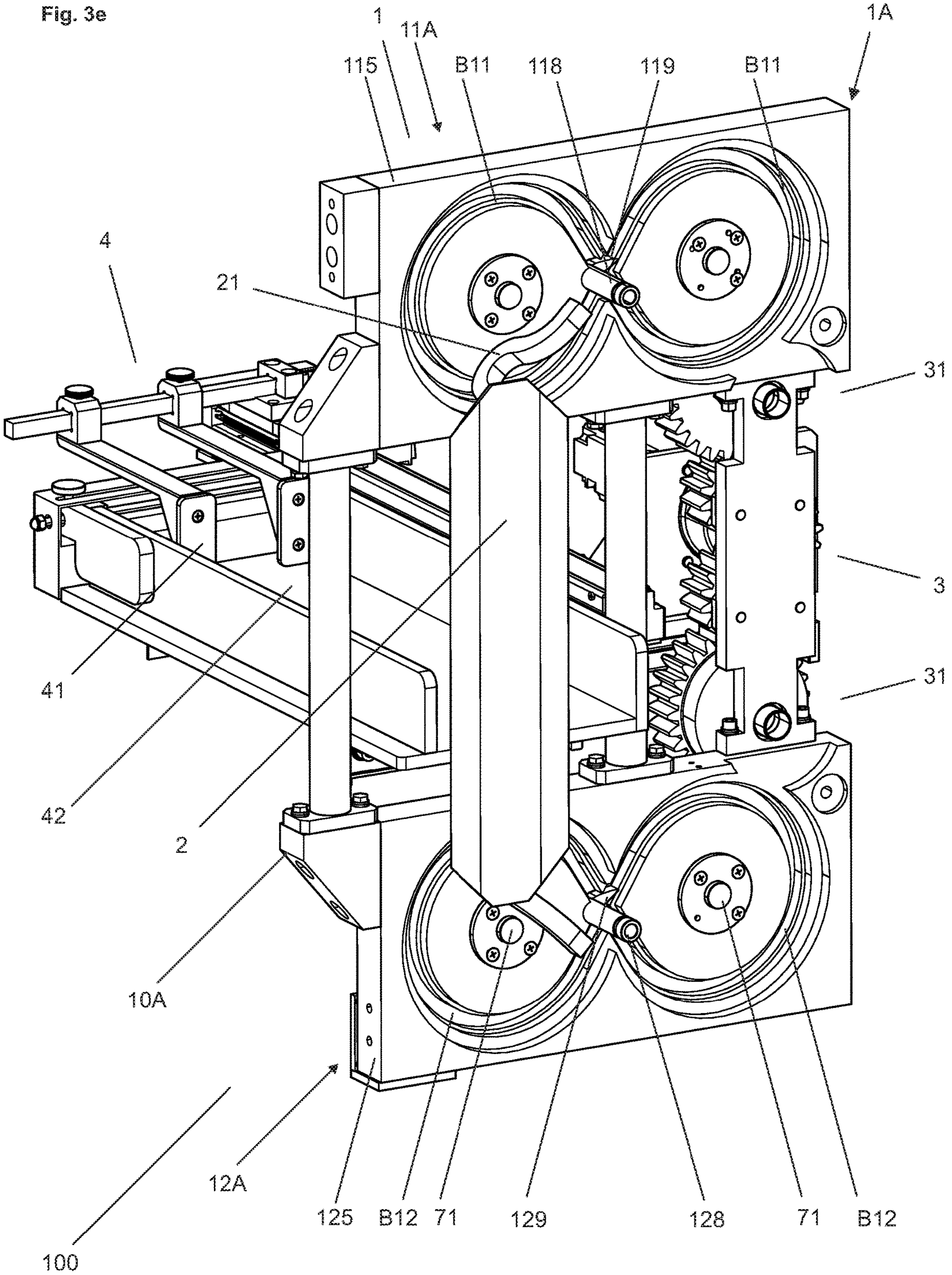
FIG. 3*e* the cutting device 100 of FIG. 3*d* without the guiding wheels 111, 112; 121, 122 looking at guiding channels B11, B12 provided in the guiding plates 115, 125.

FIG. 3*e* shows the cutting device 100 of FIG. 3*d* without the guiding wheels 111, 112; 121, 122 looking at optionally provided guiding channels B11, B12 provided in the guiding plates 115, 125. The followers 118, 128 and the guiding slides 119, 129 are guided in different channel segments of the guiding channels B11, B12. By means of the guiding channels B11, B12 the followers 118, 128 can be positively guided. The guiding slide 119, 121 ensure that the cutting tool 2 is always guided in the correct direction at the transition positions T1, T2.

Figure 4:
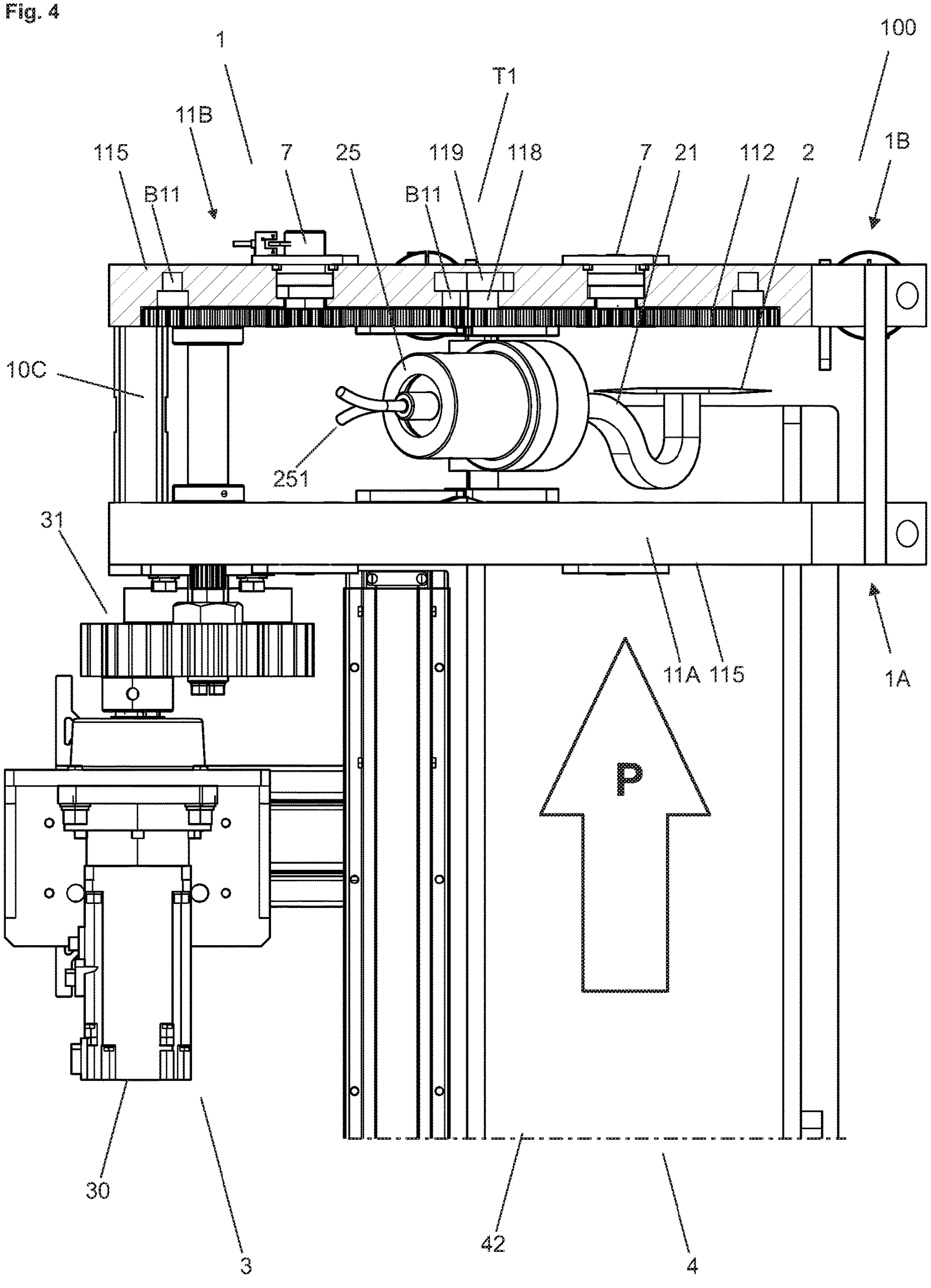
FIG. 4 the cutting device 100 of FIG. 1 with a view from above between the two guiding units 1A, 1B, between which the cutting tool 2 is held.

FIG. 4 shows the cutting device 100 of FIG. 1 with a view from above between the two guiding units 1A, 1B, between which the cutting tool 2 is held. The guiding plate 115 of the upper guiding module 11B of the second guiding unit 1B has been cut horizontally at half height along the cutting line A-A shown in FIG. 3*a*. In the cut guiding plate 115, parts of the guiding channel B11 are exposed. In the area of the transition position T1, the follower 118 and the guiding slide 119 held in the guiding channel B11 are shown. Furthermore, the inserted bearing devices 7 are visible.

Figure 5A:
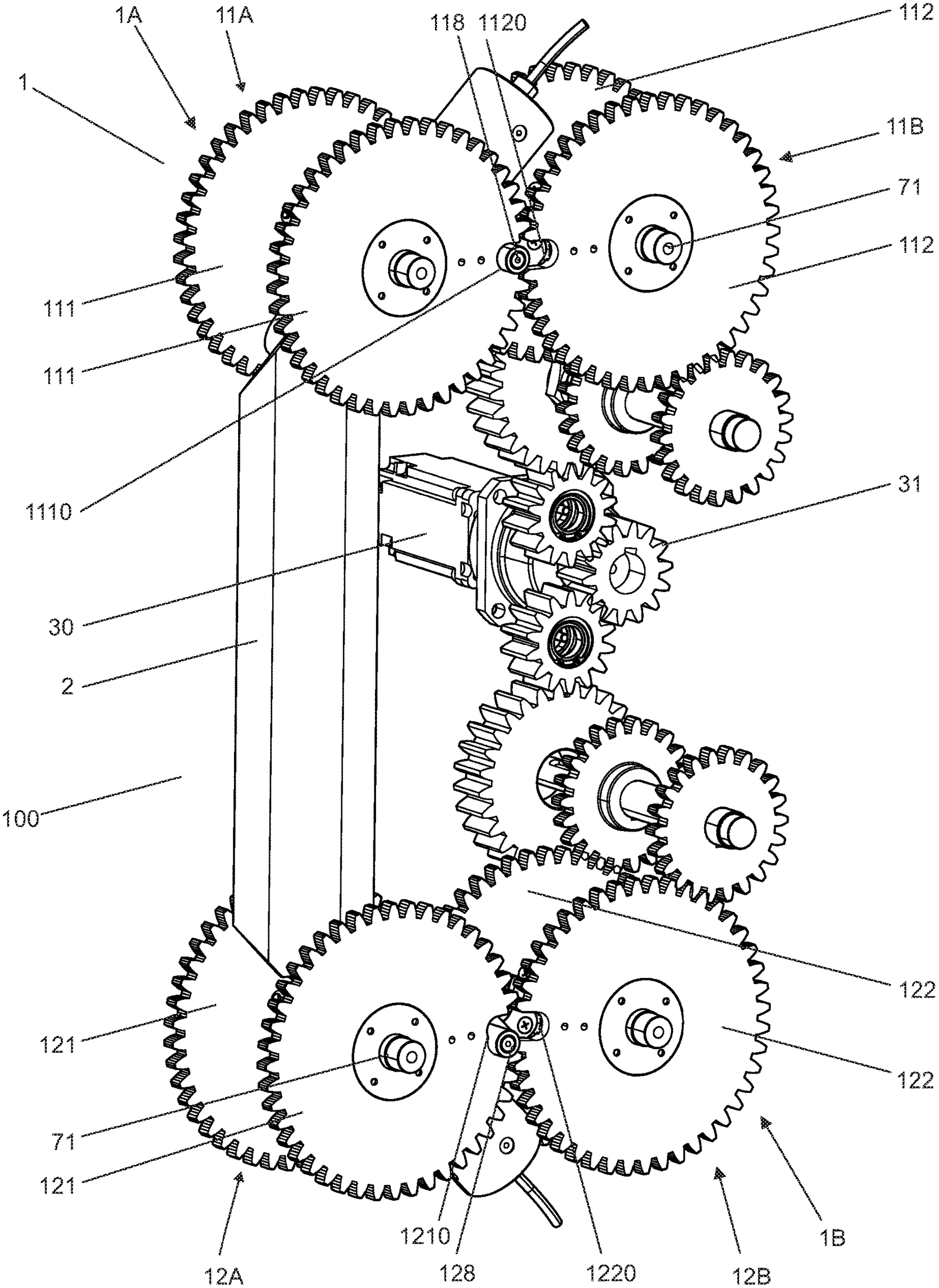
FIG. 5*a* the cutting device 100 of FIG. 1 with the moving elements the two guiding units 1A, 1B, the guiding device 1 and the cutting tool 2, which is held by followers 118, 128, which are alternately circulated around the first guiding wheels 111, 121 and the second guiding wheels 112, 122.

FIG. 5*a* shows the cutting device 100 of FIG. 1 with the moving elements the two guiding units 1A, 1B of the guiding device 1 and the cutting tool 2 in the position of FIG. 2*a*. The cutting tool 2 is held between the first and second guide wheels 111, 121; 112, 122 of the first and second guiding unit 1A, 1B by followers 118, 128 of the two guiding units 1A, 1B.

Figure 5B:
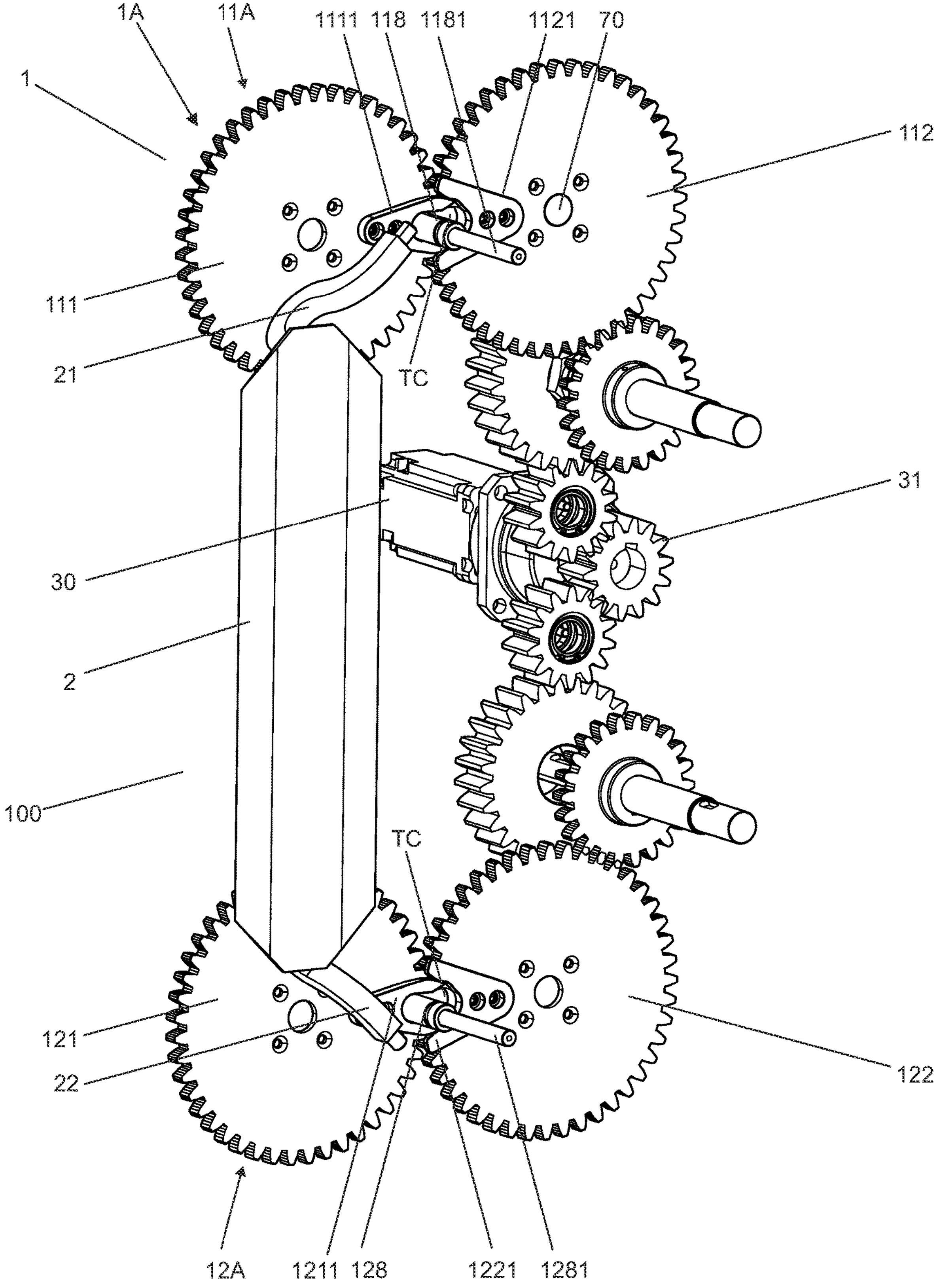
FIG. 5*b* the cutting device 100 of FIG. 5*a* with the moving elements of the first guiding unit 1A of the guiding device 1.

FIG. 5*b* shows the cutting device 100 of FIG. 5*a* with the moving elements of the first guiding unit 1A of the guiding device 1. As mentioned, the guiding device 1 can also be operated in this configuration. It is shown that guiding shafts 1181, 1281 protrude from the followers 118, 128. The followers 118, 119 of the two guiding units 1A, 1B are hollow cylindrical and rotatably held on both sides by the guiding shafts 1181, 1281.

FIG. 5*b* shows further that the first guiding wheel 111; 121 is provided with a first guiding collar 1111; 1211, which projects beyond the first guiding wheel 111; 121 and engages at the transfer position T1, T2 in a second guiding collar 1121; 1221, which is attached to the second guiding wheel 112, 122. The guiding collars 1111, 1211, 1121, 1122 are V-shaped and enclose with two guiding arms the associated receiving opening 1110, 1120, 1210, 1220 of the related guiding wheel 111, 112, 121, 122. Through the mutual engagement of the guiding collars 1111, 1211; 1121, 1122, a transfer channel TC is formed at the transfer position T1, T2, through which the followers 118, 128 can pass from one to the other receiving opening 1110, 1210; 1120, 1220 in a controlled manner. The guiding arms of the guiding collar 1111, 1211, 1121, 1122 can be shaped as required, so that, for example, a gradient results, along which the followers 118, 128 can roll or slide in accordance with the centrifugal forces and gravitational forces acting on them.

Figure 5C:
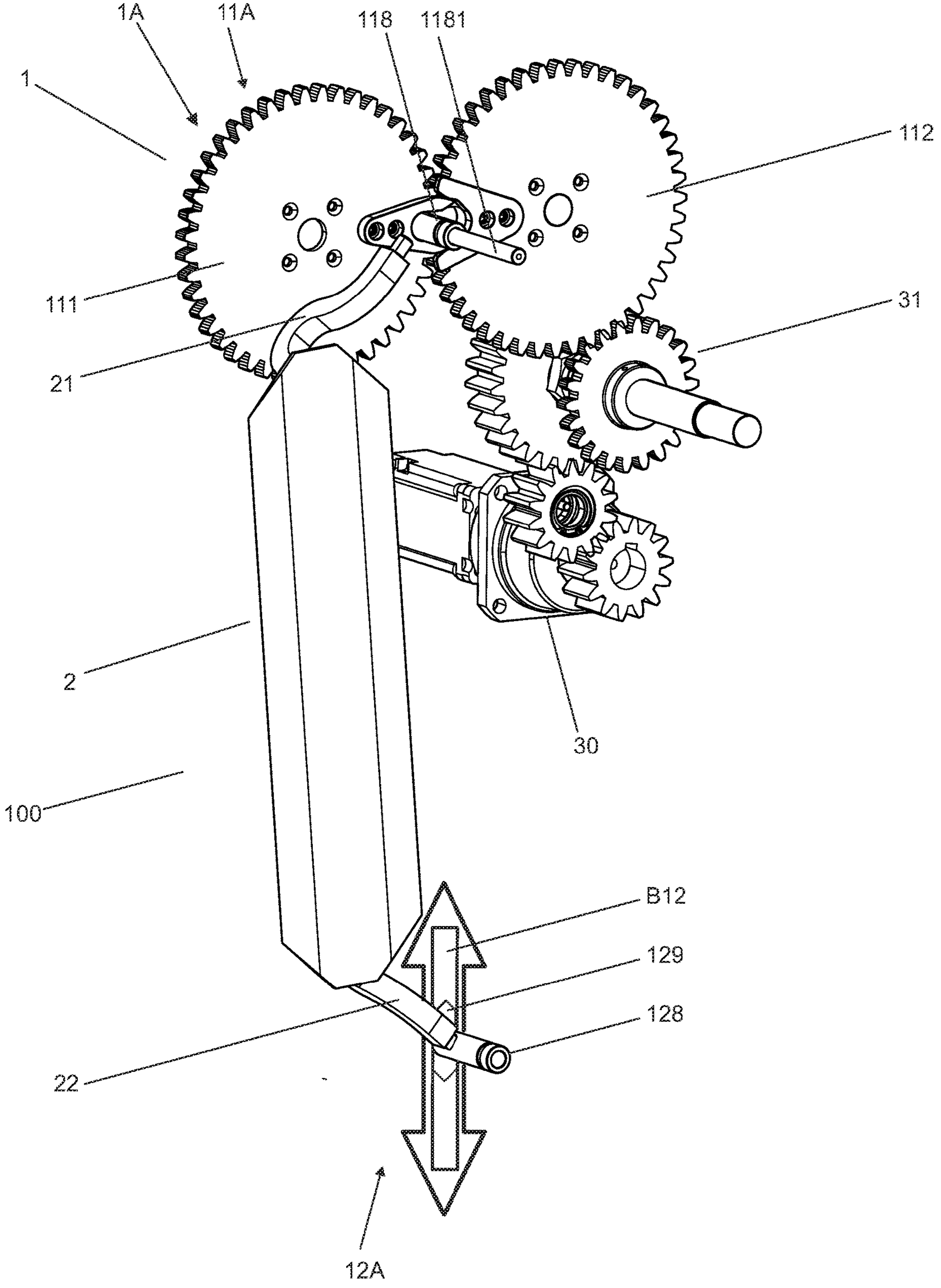
FIG. 5*c* the cutting device 100 of FIG. 5*b* with the first guiding unit 1A, optionally with the not shown second guiding unit 1B in a preferred embodiment, in which only the first connecting part 21 of the cutting tool 2 is circulated around the guiding wheels 111, 112 of the upper guiding module 11 and the second connecting part 22 with the related follower 128 in the lower guiding module 12A is guided back and forth in a straight or curved, vertical or inclined guiding channel B12.

FIG. 5*c* shows the cutting device 100 of FIG. 1 with the first guiding unit 1A, optionally with the not shown second guiding unit 1B in a preferred embodiment, in which only the first connecting part 21 of the cutting tool 2 is circulated around the guiding wheels 111, 112 of the upper guiding module 11 and the second connecting part 22 in the lower guiding module 12A is cyclically guided back and forth in a straight or curved, vertical or inclined guiding channel B12. In principle, a self-contained second guiding channel B12, for example running along a circle or an ellipse, can also be provided. In the example shown, the follower 128 and the optionally provided guiding slide are guided vertically upwards and downwards.

Figure 5D:
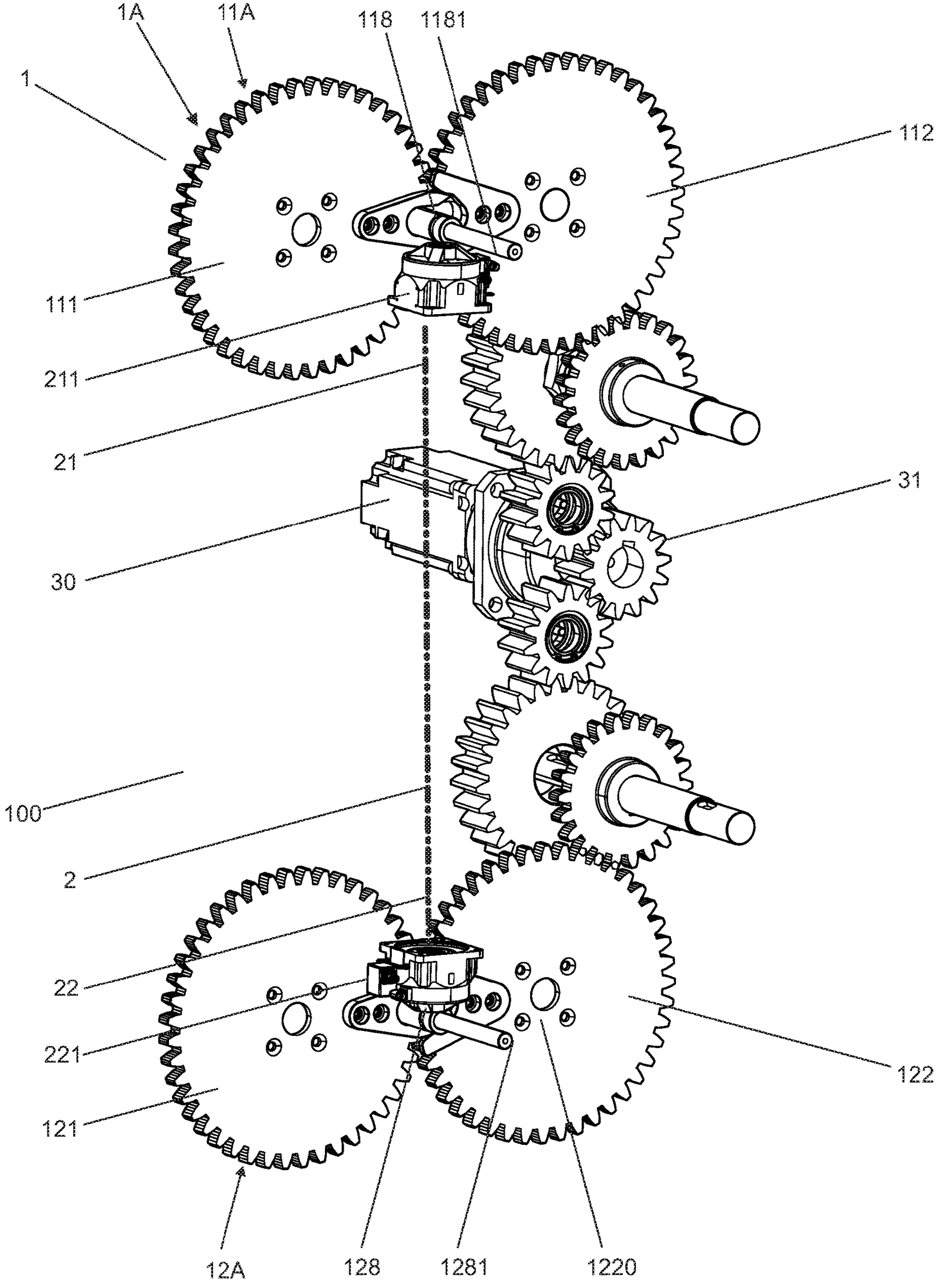
FIG. 5*d* the cutting device 100 of FIG. 5*b* with the moving elements of the two guiding units 1A of the guiding device 1 with a wire-shaped cutting tool 2, which is optionally held rotatable about its longitudinal axis by motors 211, 221.

FIG. 5*d* shows the cutting device 100 of FIG. 5*b* with the moving elements of the guiding unit 1A of the guiding device 1 with a wire-shaped cutting tool 2. The cutting tool 2 is mounted rotatably about its longitudinal axis and is preferably connected to and driven by electric tool motors 211, 221 at both connecting parts 21, 22.

Figure 6:
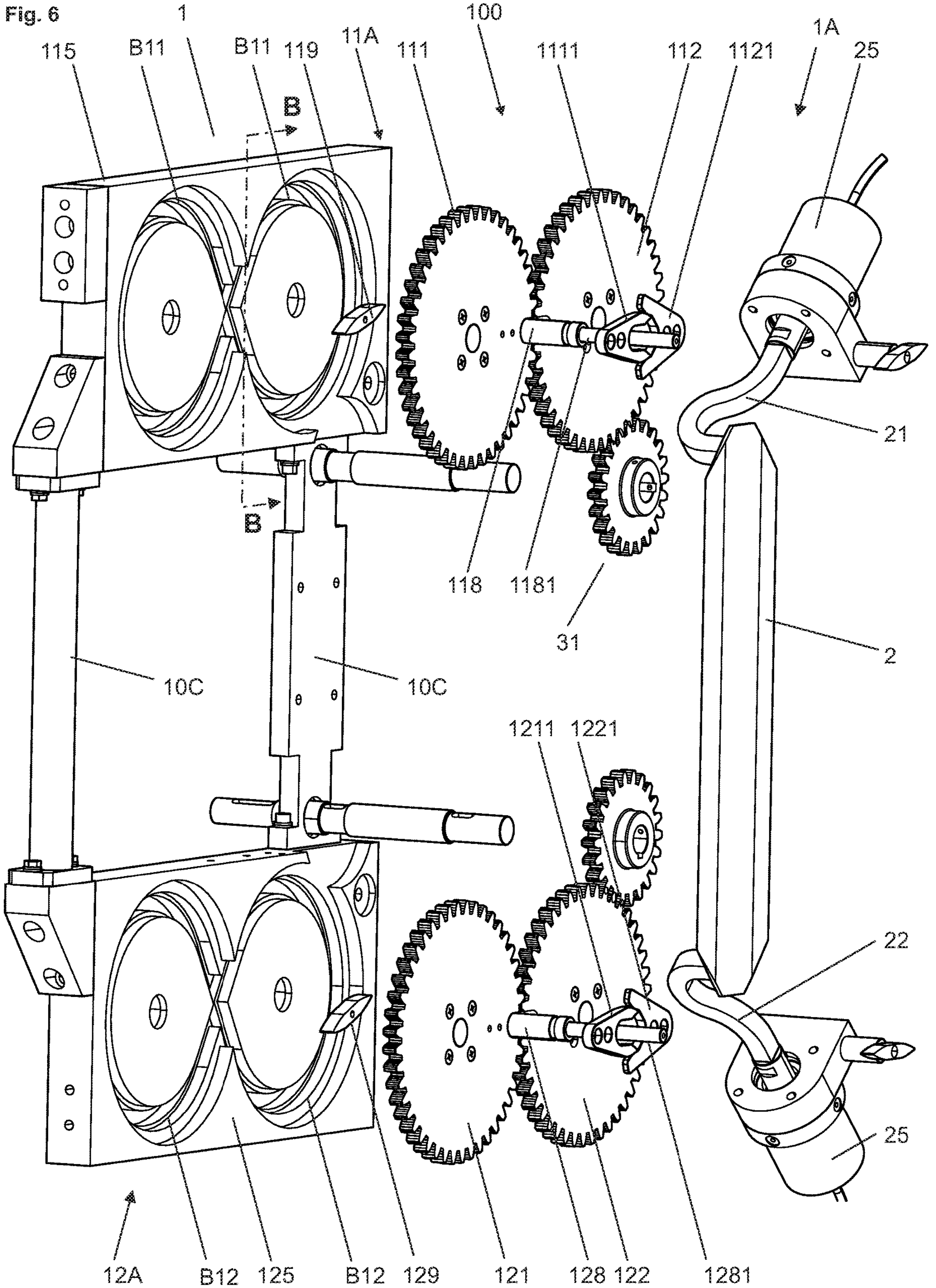
FIG. 6 the guiding device 1 with the first guiding unit 1A and the tool unit 2 with the ultrasonic transducers 25 of FIG. 3*c* in exploded view.

FIG. 6 shows an exploded view of the guiding device 1 with the first guiding unit 1A and the tool unit 2 with the ultrasonic transducers 25 of FIG. 3*c*.

Figures 7A, 7B, 7C, 7D:
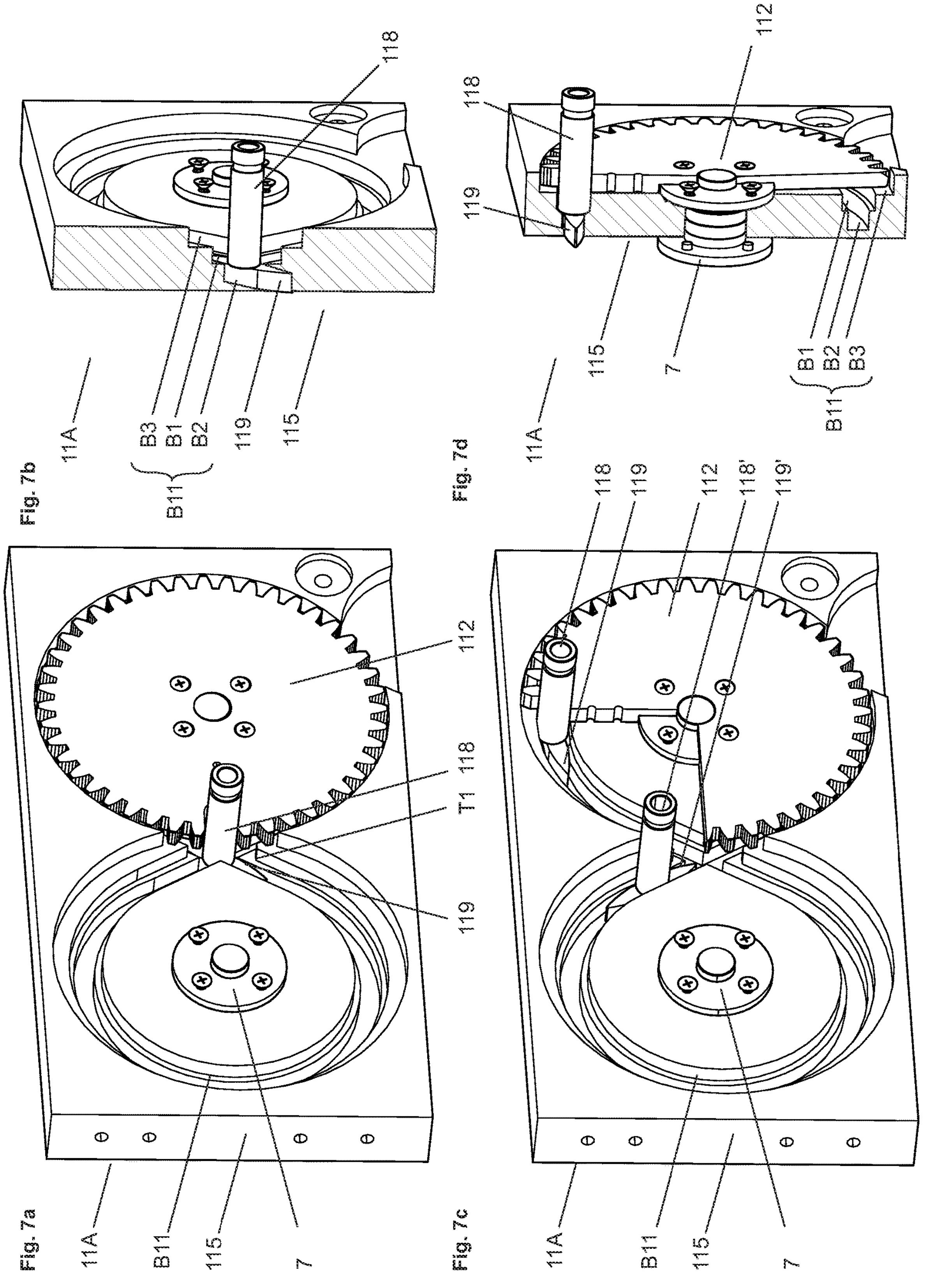
FIG. 7*a* the upper guiding module 11A of FIG. 3*d* without the first guiding wheel 111 with the follower 118 at the transfer position T1 between the first and second guiding wheels 111, 112.
FIG. 7*b* the upper guiding module 11A with a vertical section along the section line B-B of FIG. 6 through the guiding plate 115 at the transfer position T1 of the follower 118.
FIG. 7*c* the upper guiding module 11A of FIG. 3*d* without the first guiding wheel 111 with the follower 118 moved further by a quarter turn of the second guiding wheel 112 and with the follower 118' at a further position.
FIG. 7*d* the upper guiding module 11A of FIG. 7*c* with a section through the guiding plate 115 at the position of the follower 118, which was reached after the quarter rotation of the second guiding wheel 112.

FIG. 7*a* shows the upper guiding module 11A of FIG. 3*d* without the first guiding wheel 111 with the follower 118 at the transfer point T1 between the first and second guiding wheel 111, 112.

FIG. 7*b* shows the upper guiding module 11A with a vertical section along the intersection line B-B of FIG. 6 through the guiding plate 115 at the position of the follower 118. It is shown that the guiding slide 119 is correctly aligned and guides the follower 118 correctly over the intersection of the guiding channel B11.

The guiding channel B11 comprises three channel segments B1, B2 and B3. In the middle channel segment B1 an end piece of the follower 118 is guided. In the lowest channel segment B2 the guiding slide 119 is aligned and guided accordingly. In the uppermost channel segment B3 the guiding wheels 111, 112 are countersunk. This ensures that the follower 118, 128 can only detach from the guiding wheels 111, 112; 121, 122 at the transfer positions T1, T2.

At the transfer point T1, the middle channel segment B1 is somewhat wider, which is why the guiding here is essentially done by the guiding slide 119.

FIG. 7*c* shows the upper guiding module 11A of FIG. 3*d* without the first guiding wheel 111 with the follower 118 moved further by a quarter turn of the second guiding wheel 112. Furthermore, the follower 118' is shown at a further position within the part of the guiding channel B11 in the area of the first guiding wheel 111. The follower 118 has been moved in a clockwise circular path around the second guiding wheel 112 and inserted from below into the circular path around the first guiding wheel 111.

FIG. 7*d* shows the upper guiding module 11A of FIG. 7*c* with a vertical section along the section line B-B of FIG. 6 through the guiding plate 115 at the position of the follower 118, which was reached after the quarter turn of the second guiding wheel 112. The follower 118 is guided here in the middle channel segment B2 with little play. The guiding slide 119 is horizontally aligned in this position in the lowest channel segment B1.

Figure 8:
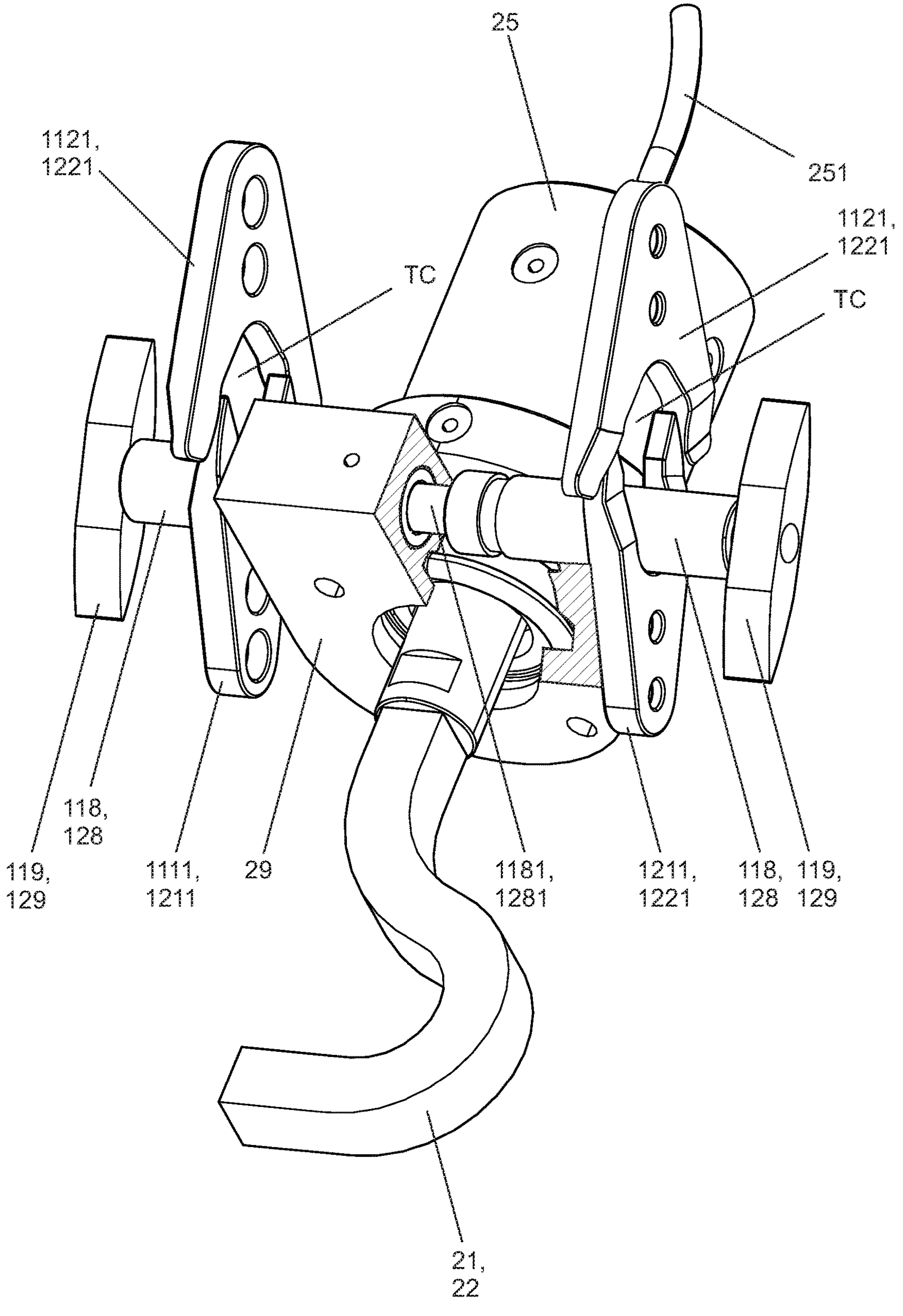
FIG. 8 an ultrasonic transducer 25 taken from the cutting device 1 of FIG. 1, which is connected on the one hand to a connecting part 21, 22 of the cutting tool 2 and on the other hand to a bearing block 29 shown with a quarter section, which is held on both sides by followers 118, 128.

FIG. 8 shows an ultrasonic transducer 25 taken from the cutting device 1 of FIG. 1, which is connected on the one hand to a connecting part 21; 22 of the cutting tool 2 and on the other hand to a bearing block 29 shown with a quarter section, which is held on both sides by followers 118, 128. The followers 118, 128 are penetrated by a guiding shaft 1181; 1281, which projects beyond the followers 118, 128 on both sides. The two end pieces of the guiding shaft 1181; 1281 are connected to the guiding slides 119; 129. Also shown are the guiding collars 1121, 1221 which engage with each other at the transfer position T1, T2 and form a transfer channel TC. The bearing block 29, which comprises a bearing channel for receiving the guiding shaft 1181, 1281, can be of any shape and can hold any auxiliary devices. For example, the tool motors 211, 221 of FIG. **5*d* are mounted on such a bearing block 29**.

FIG. 9 shows the cutting device 1 of FIG. 1 in a further preferred embodiment and a tool drive 3, which comprises a force transmission device 310 with a drive belts 310. The function of the control unit 5 has been described above.

Figure 10:
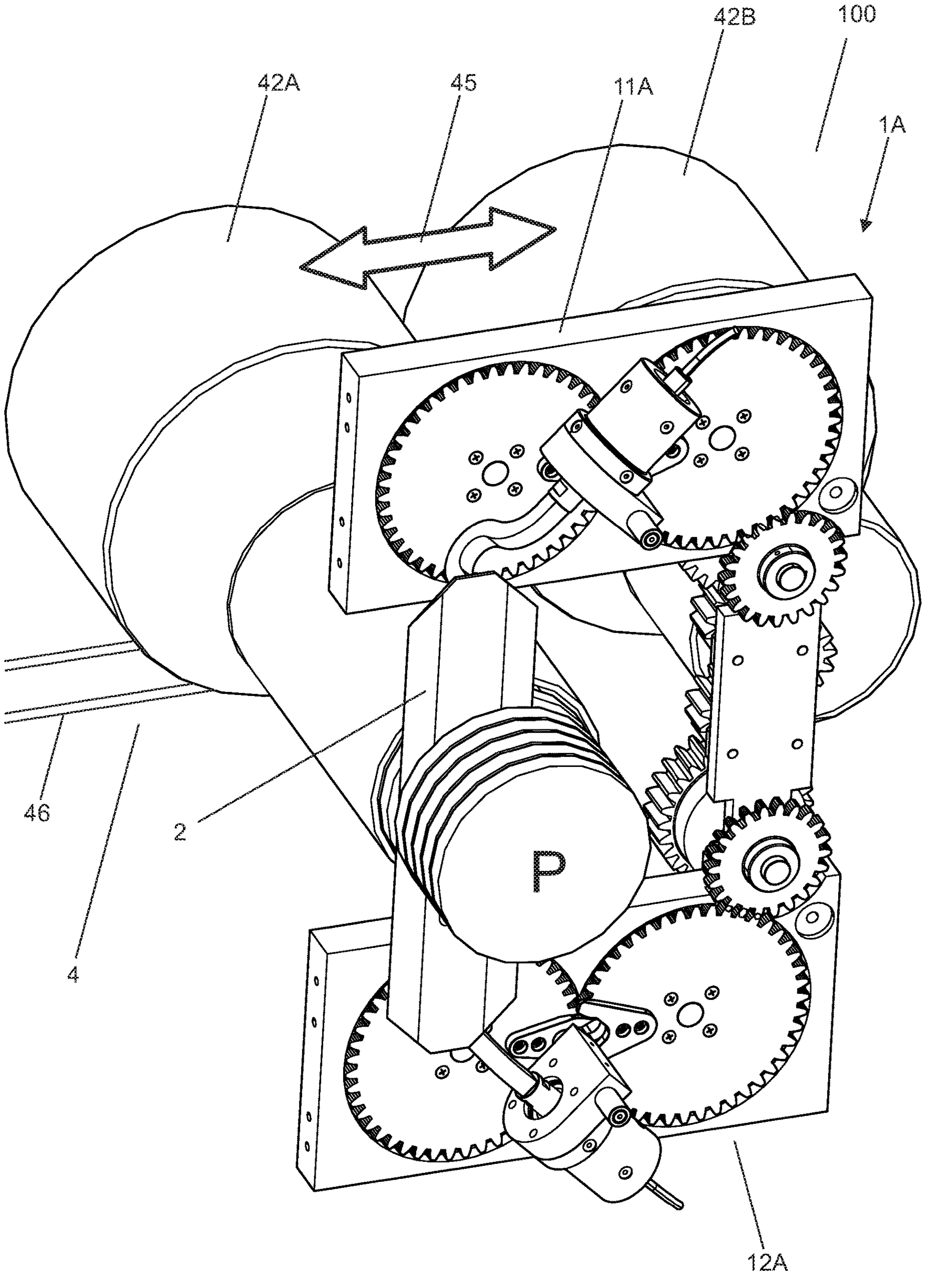
FIG. 10 the cutting device 1 of FIG. 1 with a further exemplarily shown conveyor device 4.

FIG. 10 shows the cutting device 1 of FIG. 1 with one of the guiding units 1 according to the FIGS. 1-9, in this case with only one guiding unit 1A and with a conveyor device 4 with at least one tubular feeding body 42A, which is preferably funnel-shaped or comprises a funnel-shaped element. The feeding body 42A can comprise a tube with a round, for example elliptical, oval or circular, or a polygonal, for example rectangular, square or triangular cross-section. The process material P is conveyed through the feeding body 42A, for example by means of an extendable plunger or piston.

Optionally, two or more feeding bodies 42A, 42B are provided, which can be exchanged by means of a changeover device 45, or can be moved with their outlet opening alternately in front of the cutting tool 2. For example, the feeding bodies 42A, 42B are slidably mounted on rails 46.

LIST OF REFERENCES

100 cutting device
1 guiding device
1A first guiding unit
10 mounting structure, machine frame
10A structural unit of the first guiding unit 1A
1B second guiding unit
10B structural unit of the second guiding unit 1B
10C connecting elements of the guiding units 1A, 1B
11A, 11B upper guiding modules
111 upper first guiding wheels
1110 receiving opening
1111 guiding collar
112 upper second guiding wheels
1120 receiving opening
1121 guiding collar
115 upper guiding plates
118 upper follower
118' upper follower at a further position
1181 upper guiding shafts
119 upper guiding slide
119' upper guiding slide at a further position
12A, 12B lower guiding modules
121 lower first guiding wheels
1210 receiving opening
1211 guiding collar
122 lower second guiding wheels
1220 receiving opening
1221 guiding collar
125 lower guiding plates
128 lower follower
1281 lower guiding shafts
129 lower guiding slide
2 cutting tool, blade or wire
200 blade
201 first cutting edge
202 second cutting edge
21 first connecting part of the cutting tool
22 second connecting part of the cutting tool
25 ultrasonic transducer
251 connection cable
29 mounting body
3 tool drive
30 drive motor
31 force transmission device with gear wheels
310 force transmission device with drive belts
4 conveyor device
40 conveyor motor
41 pushing device
411 feed slide
412 feed track
413 feeding tools, preferably adjustable
42 feeding body, such as tube or plate
42A, 42B exchangeable feeding body
421 side plates, preferably adjustable
43 output plate
45 changeover device
46 rails of the changeover device
5 control device
7 bearing devices for the guiding wheels
70 bearing opening
71 bearing shafts
72 bearing body
B0 linear guiding channel
B11, B12 guiding channel in the guiding plate 115, 125
B1 first channel segment for the follower
B2 second channel segment for the guiding slide
B3 third channel segment for the guiding wheels
P process material
T1 first transfer position
T2 second transfer position
TC transfer channel

The invention claimed is:

1. A cutting device, comprising:
a tool drive;
a cutting tool having a first connecting part and a second connecting part,
wherein the first connecting part connects to a first follower and the second connecting part connects to a second follower;
a guiding device, wherein the guiding device comprises:
a first guiding unit with a first guiding module and a second guiding module,
wherein the guiding device holds the first follower displaceable along a first guideway and the second follower displaceable along a second guideway,
wherein the first guiding module comprises a first guiding wheel and a second guiding wheel,
wherein the first guiding wheel and the second guiding wheel are held each by related bearing devices rotatable in a guiding plane,
wherein the first guiding wheel and the second guiding wheel are peripherally adjacent to one another at a first transfer position,
wherein the first guiding wheel and the second guiding wheel each comprises an outwardly open receiving opening, which is suitable for receiving the first follower,
wherein the first guiding wheel and the second guiding wheel are rotatable by the tool drive in opposite directions with the same angular velocity, and
wherein the first guiding wheel and the second guiding wheel are arranged in such a way that the receiving openings of the first guiding wheel and the second guiding wheel lie opposite one another at the first transfer position after each revolution of the first guiding wheel and the second guiding wheel, so that the first follower is transferable alternately from one receiving opening into the other receiving opening at the first transfer position and is further guidable alternately along the periphery of the first guiding wheel or of the second guiding wheel.

2. The cutting device according to claim 1, wherein the second follower is mounted in the second guiding module slidable along a linear or curved guideway or along a linear or curved guiding channel at a constant distance from the first follower.

3. The cutting device according to claim 1, wherein the second guiding module comprises a first guiding wheel and a second guiding wheel, a) which are held rotatable by related bearing devices;

b) which are peripherally adjacent to each other at a second transfer position;

c) which each comprises an outwardly open receiving opening, which is suitable for receiving the second follower;

d) which are rotatable by the tool drive in opposite directions with the same angular velocity; and e) which are arranged in such a way that their receiving openings lie opposite one another after each revolution of the first guiding wheel and the second guiding wheel of the second guiding module at the second transfer position, so that the second follower can be transferred alternately from one receiving opening to the other receiving opening in each case at the second transfer position and can be guided further alternately along the periphery of the first guiding wheel or of the second guiding wheel of the second guiding module.

4. The cutting device according to claim 1, wherein the guiding device comprises a second guiding unit, wherein the second guiding unit comprises a first guiding module and a second guiding module, wherein the first guiding unit and the second guiding unit are arranged face to face in parallel and symmetrically with regard to guiding wheels of the first guiding unit and guiding wheels of the second guiding unit in such a way that the cutting tool is held between the first and the second guiding units and is connected with the first connecting part to the coaxially aligned first followers of the first and second guiding units and is connected with the second connecting part to the second followers of the first and the second guiding units.

5. The cutting device according to claim 4, wherein all of the guiding modules of the first guiding unit and all of the guiding modules of the second guiding unit comprise a guiding plate which serves for supporting the guiding wheels of the related guiding module and which comprises a guiding channel extending parallel to the related guideway, which comprises at least one channel segment which serves for direct or indirect guiding of the related follower.

6. The cutting device according to claim 5, wherein a first channel segment is provided for receiving an end portion of the related follower.

7. The cutting device according to claim 5, wherein a second channel segment is provided for receiving an elongated guiding slide, which is directly or indirectly connected to the related follower and by means of which the associated follower can always be guided in a straight direction through a crossing point of the second channel segment, which is located at the related transfer position.

8. The cutting device according to claim 4, wherein the guiding wheels of the first guiding module of the first guiding unit, the guiding wheels of the second guiding module of the first guiding unit, the guiding wheels of the first guiding module of the second guiding unit, and the guiding wheels of the second guiding module of the second guiding unit are designed as toothed wheels which engage positively in one another.

9. The cutting device according to claim 4, wherein the guiding wheels of the first and second guiding modules of the first guiding unit and the guiding wheels of the first and second guiding modules of the second guiding unit are directly or indirectly connected to modules of the tool drive or to a force transmission device comprising gears or drive belts.

10. The cutting device according to claim 9, wherein the cutting tool is a wire or that the cutting tool is a wire which is rotatably mounted about its longitudinal axis and is connected at one connecting part or at both connecting parts each with a tool motor.

11. The cutting device according to claim 1, wherein an at least approximately V-shaped first guiding collar is arranged at the receiving opening of the first guiding wheel and an at least approximately V-shaped second guiding collar is arranged at the receiving opening of the second guiding wheel, wherein the first guiding collar projects beyond the first guiding wheel and engages in the second guiding collar at the transfer position.

12. The cutting device according to claim 1, wherein the first follower of the first guilding unit and a second guiding unit are connected with one another by a first guiding shaft and/or that the second follower of the first guilding unit and the second guiding units are connected with one another by a second guiding shaft.

13. The cutting device according to claim 1, wherein the first and second followers are connected directly or by a bearing block to the related first or second connecting parts or to an ultrasonic transducer which delivers ultrasonic energy to the cutting tool.

14. The cutting device according to claim 1, wherein the guiding wheels of the first and second guiding modules of the first guiding unit form a rectangle or a parallelogram with their axes of rotation and that the guiding wheels of the first and second guiding modules of the first guiding unit form a rectangle or a parallelogram with their axes of rotation.

15. The cutting device according to claim 1, wherein the cutting tool comprises a blade with a cutting edge on one side or on opposite sides.

* * * * *